(12) United States Patent
Mohammadi et al.

(10) Patent No.: US 11,958,764 B2
(45) Date of Patent: *Apr. 16, 2024

(54) RAPID REDUCTION OF AQUEOUS SELENATE WITH CHROMOUS IONS

(71) Applicant: SEABRIDGE GOLD INC., Toronto (CA)

(72) Inventors: Maryam Mohammadi, North Vancouver (CA); Berend Wassink, Delta (CA); Jianming Lu, Vancouver (CA); David Dreisinger, Delta (CA)

(73) Assignee: Seabridge Gold Inc., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/750,986

(22) Filed: May 23, 2022

(65) Prior Publication Data

US 2022/0281762 A1 Sep. 8, 2022

Related U.S. Application Data

(63) Continuation of application No. 16/845,608, filed on Apr. 10, 2020, now Pat. No. 11,370,677.

(Continued)

(51) Int. Cl.
*C02F 1/70* (2023.01)
*C02F 1/42* (2023.01)
(Continued)

(52) U.S. Cl.
CPC .............. *C02F 1/70* (2013.01); *C02F 1/42* (2013.01); *C02F 1/4678* (2013.01);
(Continued)

(58) Field of Classification Search
None
See application file for complete search history.

(56) References Cited

U.S. PATENT DOCUMENTS 2,834,652 A 5/1958 Hollander et al.
2,860,954 A 11/1958 Bueker et al.
(Continued)

FOREIGN PATENT DOCUMENTS

CA 1081470 7/1980
CA 1139258 1/1983

OTHER PUBLICATIONS

Avudainayagam et al., (2003). Chemistry of chromium in soils with emphasis on tannery waste sites. Reviews of environmental contamination and toxicology (vol. 178).
(Continued)

*Primary Examiner* — Chester T Barry
(74) *Attorney, Agent, or Firm* — Casimir Jones, S.C.; Mary Ann D. Brow

(57) ABSTRACT

Processes are provided for the kinetically efficient reduction of selenate species to selenide species using chromous ions in acidic solution. This reduction may advantageously be carried out in the presence of sulphate species, with selective selenate reduction in preference to the reduction of sulfate. The reduced selenate may be removed from the chromous-treated solution, for example by precipitation of a copper-selenide solid. The chromic ions formed by reaction of chromous ions in the reduction of selenate may also be removed from solution, for example by addition of a base to form an insoluble chromic hydroxide solid. The chromic hydroxide may be recycled to regenerate chromous ions, for example by electrolysis. In this way, systems are provided for continuously removing dissolved selenium from wastewater streams.

16 Claims, 11 Drawing Sheets

Related U.S. Application Data

(60) Provisional application No. 62/829,502, filed on Apr. 4, 2019.

(51) Int. Cl.
    *C02F 1/467*     (2023.01)
    *C02F 1/52*     (2023.01)
    *C02F 101/10*     (2006.01)
    *C02F 101/22*     (2006.01)

(52) U.S. Cl.
    CPC ...... *C02F 1/5245* (2013.01); *C02F 2101/106* (2013.01); *C02F 2101/22* (2013.01); *C02F 2301/046* (2013.01); *C02F 2303/16* (2013.01); *C02F 2303/18* (2013.01)

(56) References Cited

U.S. PATENT DOCUMENTS

| | | |
|---|---|---|
| 4,214,900 A | 7/1980 | Crnojevich et al. |
| 4,345,912 A | 8/1982 | Bartz |
| 4,374,808 A | 2/1983 | Weir et al. |
| 5,200,082 A | 4/1993 | Olsen et al. |
| 5,494,582 A | 2/1996 | Goodman |
| 9,963,360 B2 | 5/2018 | Kratochvil et al. |
| 10,752,522 B2 | 8/2020 | Henderson et al. |
| 11,370,677 B2 * | 6/2022 | Mohammadi ............ C02F 1/42 |

OTHER PUBLICATIONS

Bae et al., (2002). Chromium redox couples for application to redox flow batteries. Electrochimica Acta, 48(3), 279-287.
Bagnall, Chemistry of the Elements, Chapter 24: 16-Selenium, Tellurium and Polonium, 1973.
Balcerzak, Z. M. and M. (Ed.). (2000). Analytical Spectroscopy Library. In Analytical Spectroscopy Library (vol. 10, p. ii). Elsevier.
Beatty et al., (2014). Ambient Water Quality Guidelines for Selenium Technical Report: Update. Retrieved from http://www.env.gov.bc.ca/wat/wq/BCguidelines/selenium/selenium.html.
Beverskog et al., (1997). Revised Probaix Diagrams For Chromiums At 25-3000C. Corrosion Science, 39(1), 43-57.
CCME. (2009). Canadian Soil Quality: Guidelines Selenium Environmental and Human Health effects. Winnipeg.: Canadian Council of Ministers of the Environment.
Chapman, (2000). Proceedings of the 24 Annual British Columbia Mine Reclamation Symposium (pp. 148-159). British Columbia: Annual British Columbia Mine Reclamation Symposium.
Cooke et al., (1987). Aquatic chemistry of selenium: evidence of biomethylation. Environmental Science & Technology, 21(12), 1214-1219.
Dawson et al., (1972). Kinetics of the Reduction of Metalloproteins by Chromous Ion, PNAS, 69(1), 30-33.
Dellien et al., (1976). Chromium, Molybdenum, and Tungsten: Thermodynamic Properties, Chemical Equilibria, and Standard Potentials. Chemical Reviews, 76(3), 283-310.
Dubeau et al., (1971). Solubility of hydrogen selenide in water. Chemical and Engineering Data, 16, 78-91.
Eklund et al., (2014). Structure and hydrogen bonding of the hydrated selenite and selenate ions in aqueous solution. Dalton Transactions: An International Journal of Inorganic Chemistry, 43(17), 6315-6321.
Frankenberger Jr., et al., (2004). Advanced Treatment Technologies in the Remediation of Seleniferous Drainage Waters and Sediments. Irrigation and Drainage Systems, 18(1), 19-42.
Geoffroy, (2011). Selenium Removal from Aqueous Solutions. Ph.D. Thesis. McGill University.
Golder Associate Inc., (2009). Literature Review of Treatment Technologies to Remove Selenium from Minning Influenced Water. USA.
Gudyanga, (1988). Electrohydrometallurgical Reduction of Cassiterite (SnO2) Associated With Sulphide Minerals. Ph.D. Thesis. University of London.
Hansen et al., (1996). Abiotic Nitrate Reduction to Ammonium: Key Role of Green Rust. Environmental Science & Technology, 30(6), 2053-2056.
Hong (2015). Fundamental Study on Tin Recovery in Acidic Aqueous Systems. The University of British Columbia.
International Atomic Energy Agency. (2007). Speciation analysis of arsenic, chromium and selenium in aquatic media : proceedings of a final research coordination meeting held in Vienna, Apr. 26-29, 2004. International Atomic Energy Agency.
Jalan et al., (1981). Requirements for optimization of electrodes and electrolyte for the iron/chromium Redox flow cell.
Johnson et al., (1982) Chemical and Electrochemical Behavior of the Cr(III)/Cr(II) Half Cell in the NASA Redox Energy Storage System. Detroit, Michigan.
Kelsall et al., (1988a). Chemical and Electrochemical and Kinetics in Equilibria Aqueous Cr(III)/Cr(II) Chloride Solutions. Electroanal Chem, 244, 179-201.
Kelsall et al., (1999b). Indirect Electrochemical Reduction of Lead Sulfide precipitates. In 5th European Sympisium on Electrochemical Engineering (vol. 145, pp. 239-348).
Klaning et al., (1986). Selenium(V). A pulse radiolysis study. The Journal of Physical Chemistry, 90(21), 5460-5464.
KOTAŚ et al., (2000). Chromium occurrence in the environment and methods of its speciation. Environmental Pollution, 107(3), 263-283.
Koyama et al., (2000). Removal of selenium in effluents of metal refineries by chemical reduction using solid iron. In processing and Environmental Aspects of As, Sb, Se, Te, and Bi (pp. 363-370).
Ladriere (1973). Reduction of selenic acid by copper in the presence of cupric ions. Bulletin Des Societes Chimiques Belges, 82, 99-122. (English Abstract).
Lange (1966). The Chemistry of Selenium, Tellurium, and Polonium. Journal of the American Chemical Society, 88(19), 4548-4548.
Lemly (2004). Aquatic selenium pollution is a global environmental safety issue. Ecotoxicology and Environmental Safety, 59(1), 44-56.
Levy et al., (1990). Spectroscopic Determination of the Second Dissociation Constant of H2Se and the Activity Coefficients and Spectral Shifts of Its Ions. Journal of Physical Chemistry, 94, 7842-7847.
Lingane et al., (1948). Potentiometric Titration of +4 and +6 Selenium and Tellurium with Chromous Ion. Journal of the American Chemical Society, 70(6), 1997-2000.
Lingane et al., (1948). Preparation of Standard Chromous Sulfate or Chromous Chloride Solutions of Determinate Concentration, (5), 2-5.
Lopez-Atalaya et al., (1991). Behaviour of the Cr(III)/Cr(II) reaction on gold-graphite electrodes. Application to redox flow storage cell, 35, 225-234.
Malik et al., (1960). The Influence of Acid and Salts on the use of Chromous Chloride as a Reducing Titrant. Analytica Chimica Acta, 23, 518-523.
Mokmeli et al., (2013). Kinetics study of selenium removal from copper sulfate-sulfuric acid solution. Hydrometallurgy, 139, 13-25.
Mondal et al., (2004). Removal of selenate by Fe and NiFe nanosized particles. Industrial and Engineering Chemistry Research, 43(16), 4922-4934.
Moore et al., (2011). Methods for removing selenium from aqueous systems.
Murphy (1988). Removal of selenate from water by chemical reduction. Industrial & Engineering Chemistry Research, 27(1), 187-191. https://doi.org/10.1021/ie00073a033.
NAMC White Paper Report Addendum. (2013).
Okamot et al., (1972). one-electron reducibility of the substituted tropylium ions with chromous ion. Britain.
Olegario et al., (2010). Reduction of Se(VI) to Se(-II) by zerovalent iron nanoparticle suspensions. Journal of Nanoparticle Research.
Peak (2002). Mechanisms of Selenate Adsorption on Iron Oxides and Hydroxides. Environmental Science & Technology, 36(7), 1460-1466.

(56) References Cited

OTHER PUBLICATIONS

Peak (2006). Adsorption mechanisms of selenium oxyanions at the aluminum oxide/water interface. Colloid and Interface Science, 303, 337-345.
Philippini et al., (2013). Formation of MSeO4(aq) complexes (M2+ = Mg2+, Co2+, Ni2+, Cu2+, Cd2+) studied as a function of temperature by affinity capillary electrophoresis. Electrophoresis, 34(4), 541-551. https://doi.org/10.1002/elps.201200378.
Rai et al., (1987). Chromium(II1) Hydrolysis Constants and Solubility of Chromium(II1) Hydroxide. Inorganic Chemistry, 26(8), 345-349.
Refait et al., 2000). Reduction of SeO42-anions and anoxic formation of iron(II)-Iron(III) hydroxy-selenate green rust. Environmental Science and Technology, 34(5), 819-825.
Saji et al., (2013). Selenium electrochemistry. RSC Advances, 3(26), 10058-.
Sandy et al., (2010). Review of Available Technologies for the Removal of Selenium from Water. North America.
Seabridge Gold. (2013). Application for an Environmental Assessment Certificate/ Environmental Impact Statement. RescanTM Environmental Services Ltd.
SHUPACK (1991). The chemistry of chromium and some resulting analytical problems. Environmental Health Perspectives, 92, 7-11.
Škácha et al., (2017). Selenide Mineralization in the Příbram Uranium and Base-Metal District (Czech Republic). Minerals, 7, 91. https://doi.org/10.3390/min7060091.
Smith et al., (2009). Evaluation of treatment techniques for selenium removal. In International Water Conference (IWC).
Sobolewski (2000). Evaluation of Treatment Options to Reduce Water-Borne Selenium at Coal Mines in West-Central Alberta (No. 0-7785-4605-5). Edmonton, Alberta: Alberta Environment Water Research Users Group Edmonton.
Stefánsson et al., (2015). Chromium geochemistry and speciation in natural waters. Applied Geochemistry, 62, 200-206.
Stone et al., (1957). The Reduction of Sulfate to Sulfide in Acid Solutions by Divalent Chromium1. Journal of the American Chemical Society, 79(8), 1840-1843.
Sun et al., (1992). Modification of graphite electrode materials for vanadium redox flow battery application-I. thermal treatment. Electrochimica Acta, 37(7).
Tanimoto et al., (2013). Discrimination of Inner- and Outer-Sphere Electrode Reactions by Cyclic Voltammetry Experiments. Journal of Chemical Education, 90(6).
Terry (1997). Experimental Wetland Removal of Selenium from Wastewaters: Chevron's Enhancement Wetland as a Case Study. University of California Water Resources Center.
Thompson-Eagle et al., (1992). Bioremediation of Soils Contaminated with Selenium. In R. Lal & B. A. Stewart (Eds.), Soil Restoration (pp. 261-310). Springer New York.
Tinggi (2003). Essentiality and toxicity of selenium and its status in Australia: a review. Toxicology Letters, 137(1-2), 103-110.
Twidwell et al., (1999). Technologies and Potential Technologies for Removing Selenium From Process and Mine Wastewater. In I. Gaballah, J. Hager, & R. Solozaral (Eds.), Global Symposium on Recycling, Waste Treatment and Clean Technology (pp. 1645-1656). Spain.
Upadhyay (2006). Chemical Kinetics and Reaction Dynamics. Springer (vol. 129). New York/New delphy.
Weaver et al., (1976). Distinguishing between inner- and outer-sphere electrode reactions. Reactivity patterns for some chromium(III)-chromium(II) electron-transfer reactions at mercury electrodes. Inorganic Chemistry, 15(8), 1871-1881.
Weckhuysen et al., (1996). Surface Chemistry and Spectroscopy of Chromium in Inorganic Oxides. Chemical Reviews, 96(8), 3327-3350.
Wells et al., (1968). The Kinetics of the Reaction of Chromium(II) with Hydrazine, Hydroxyl- amine and Hydrazoic Acid in Perchlorate Media: the Formation of Halogeno- and Sulphato-Complexes of Chromium(II). J. Chem. Soc. (A), 24, 1568-1575.
Yin et al., (2000). Electrochemical synthesis of Cr(II) at carbon electrodes in acidic aqueous solutions. Journal of Applied Electrochemistry, 30(10), 1109-1117.
Zabin et al., (1964). The Reactions of Metal Oxides with Aquated Chromium ( II ) Ion. Inorganic Chemistry, 3(7).
Zhang et al., (2005). Removal of selenate from water by zerovalent iron. Journal of Environmental Quality, 34(2), 487-495.
Zielinskaignaciuk et al., (1974). Kinetics and mechanism of the Cr(III)/Cr(II) electrodereaction in concentrated perchlorates and chlorides. Journal of Electroanalytical Chemistry—J Electroanal Chem, 50(1), 41-53.

\* cited by examiner

RAPID REDUCTION OF AQUEOUS SELENATE WITH CHROMOUS IONS

FIELD

Innovations are disclosed in the field of aqueous redox chemistry, including processes for removing dissolved selenium species from wastewaters.

BACKGROUND

Selenium in a trace amount is an essential element that plays an important role in humans and animals in preventing of diseases. As a nutrient, selenium is used by human body at recommended doses of 70 µg/day for men and 50 µg/day for women (Tinggi, 2003). However, when selenium is released to the environment from both natural and industrial activities it can lead to increased concentrations in surface water, groundwater, soils, and vegetation. Unfortunately, even small concentrations of selenium can be toxic for many forms of aquatic life. Additionally, selenium accumulation to higher concentrations in wildlife species tissues leads to toxic levels for aquatic life, birds, and mammals including humans. In the interest of protecting aquatic environments, selenium discharge into the environment is closely controlled and monitored. (Beatty and Russo, 2014; IAEA, 2007; Tinggi, 2003)

Selenium in nature is mostly associated with metal sulfide minerals such as copper, iron, zinc, and lead sulfides (Zingaro and Cooper, 1974). The treatment of these ores to extract the metals of interest has the potential for selenium release and transport into surface and groundwater systems. Other sources of selenium contamination include coal mining, fossil fuel combustion, oil refining, and discharge of seleniferous drainage water from agriculture (Zingaro and Cooper, 1974). Selenium contamination in the receiving environment is a key issue for many industries and the treatment of wastewater contaminated with selenium is a growing challenge.

Selenium speciation in solution plays an important role in its removal as well as toxicology especially at low levels. Selenite ($SeO_3^{2-}$, Se(IV)) and selenate ($SeO_4^{2-}$, Se(VI)) are the most important inorganic selenium species which are generally found in water and known to be toxic (Beatty and Russo, 2014). Relative to selenate, selenite can be quite easily removed from solutions using various treatment methods such as chemical reduction (e.g., zero valent iron and sulfur dioxide), and precipitation and adsorption by ferrihydrite salt. These methods are not efficient for selenate removal due to the high solubility of selenate in the solutions, its weak adsorption on the surfaces of precipitates, and slow kinetics of selenate reduction (Murphy, 1988; Sandy and DiSante, 2010). In Canada, the Canadian Council of Ministers of the Environment (CCME) has set Water Quality Guidelines, which for selenium are 1 µg/L in fresh water. In 2014, British Colombia updated its own guideline at 2 µg/L for fresh water and marine aquatic life (Beatty and Russo, 2014; CCME, 2009).

The redox potential for the selenate/selenite redox couple is quite high; therefore, the reduction of selenate to selenite ($HSeO_4^-$ to $H_2SeO_3$ or $SeO_4^{2-}$ to $HSeO_3^-$) is thermodynamically favorable. However, kinetically, the reaction is known to be slow (Mokmeli et al., 2013; Sandy and DiSante, 2010). Consequently, reagents that are suitable to reduce selenite to elemental selenium or selenide are thermodynamically effective for selenate reduction as well, but reaction times are unacceptably long. For instance, Weir et al. (1982) reported that selenite can be quite easily reduced to elemental selenium using copper powder (99% after 1 min in 10-50 g/l sulfuric acid at room temperature). In contrast, selenate reduction with metallic copper was much slower and required a higher temperature around the boiling point (Weir et al., 1983a; Weir et al., 1982).

Various reagents have been studied for the reduction of selenate to its lower oxidation state. For example, Koyama and Kobayashi (2000) used copper, iron, zinc and aluminum powder to reduce selenate in HCl solution at pH 2 and found that iron was the most efficient reductant. Zero valent iron has a high potential for the removal of selenate (up to 100% in laboratory testing). However, the presence of certain salts like phosphate ($PO_4^{3-}$) and nitrate ($NO_3^-$) reduces the efficiency of selenate removal to 43%. Mondal et al. (2004) reported that the presence of 2.5 g/L sulphate in solution reduced the selenate removal by NiFe powder from 100% to 71.5% in a standard experiment. The other disadvantages of the use of metals in the reduction of selenate is that usually a large excess of metal is required per unit of selenate in the solution which increases the costs of reagents and introduces a significant challenge in waste management of the treatment of sludge. For instance, Mondal et al. (2004) studied the reduction of selenate by NiFe powder and found the maximum selenate removal of 98% (10 min at initial selenate concentration of 100 ppm) at a NiFe powder usage of 5 g/L. However, at a lower NiFe powder usage (0.6 g/L), the selenate removal decreased dramatically (80% after 2 h) and there was no further significant selenate removal at a longer residence time. The reduction of selenate by sulfur dioxide has also been studied and it was found that the reaction requires an autoclave at higher temperature (above 140° C.) and a long reaction time (several hours) is needed for a complete reduction (Weir et al., 1983b; Zingaro and Cooper, 1974). In general, current methods available for selenate removal from water solutions suffer from slow kinetics, incomplete removal of selenate, use of expensive reagents, high energy cost to heat solutions to high temperature and secondary contamination of the treated solution.

SUMMARY

The invention provides a process for the reduction of selenate species to selenide species in solution. Surprisingly, the chromous ion rapidly reduces selenate to selenide under acid conditions. Additionally (and also surprisingly), the chromous ion reduces selenate selectively over the reduction of sulfate where the aqueous solution contains both species. The reduced species of selenate may be removed from the chromous-treated solution, for example by precipitation of a copper-selenide solid. The chromic ions formed by reaction of chromous ions in the reduction of selenate may also be removed from solution, for example by addition of a base to form an insoluble chromic hydroxide solid. The chromic hydroxide may be recycled to regenerate chromous ions, for example by electrolysis.

Aspects of the process involve reduction of dissolved aqueous selenate (Se(VI)) in an acidic reduction medium comprising reacting the selenate with chromous (Cr(II)) ions. This reduction may for example take place at an initial Cr(II)/Se(VI) molar ratio of 8 or above. Conditions may be provide so that at least 75%, 80%, 85%, 90%, 95%, 96%, 97%, 99% or 99.5% A of the selenate is reduced to a hydrogen selenide ($H_2Se$) product. This process may take place over a reaction time, which may for example be is less than 24, 20, 15, 10 or 5 hours, to provide a selenate-barren solution having a final concentration of Se(VI). The initial concentration of Se(VI) may for example be less than 100 ppm, 90 ppm, 80 ppm, 70 ppm or 60 ppm. The initial concentration of Se(VI) may also be greater than 50 ppm, 40 ppm, 30 ppm, 20 ppm or 10 ppm. The final concentration of Se(VI) may for example be less than 5 ppm, 4 ppm, 3 ppm, 2 ppm or 1 ppm.

The reduction medium may include a dissolved sulphate, present for example in a concentration of greater than 0.1 mole/L, or less than 4 mole/L, or 0.1 to 4 mole/L, or greater than about 10 g/L, or less than about 400 g/L, or about 10 to 400 g/L. As exemplified, conditions may be provided so that the reduction by the chromous ions in the reduction medium is selective for the dissolved selenate over the dissolved sulphate.

The process may for example be carried out at an ambient temperature, below the boiling point of the reduction medium, at 10° C.-30° C., or at about 25° C.

The pH of the acidic reduction medium may for example be less than 2.2, 2.1, 2, 1.9, 1.8, 1.7, 1.6, 1.5, 1.4, 1.3, 1.2, 1.1 or 1. Alternatively, the pH of the reduction medium may be greater than 2.2, and in that case the process may be carried out above the ambient temperature, for example at an elevated temperature that is below the boiling point of the reduction medium.

The reduction of selenate by chromous ions to form the hydrogen selenide product may accordingly involve the reaction: $8CrSO_4 + H_2SeO_4 + 4H_2SO_4 = H_2Se + 4H_2O + 4Cr_2(SO_4)_3$.

The process may involve generating chromous ions by a chemical or an electrochemical reduction of a chromic solution. Electrochemical reduction may for example involve reducing a solution of potassium chromium(III) sulfate dodecahydrate ($KCr(SO_4)_2 \cdot 12H_2O$), and the reduction of the $KCr(SO_4)_2 \cdot 12H_2O$ may for example be carried out in a divided electrochemical cell. The exemplified divided electrochemical cell included a graphite felt cathode supported by a titanium mesh, a Nafion membrane separator between an anolyte and a catholyte, and an anode formed from a lead-silver alloy. The electrochemical cell may have an anolyte compartment containing a sulfuric acid solution, with the reactions carried out in the divided electrochemical cell being:

Cathode: $2KCr(SO_4)_2 + 2e + 2H^+ = 2CrSO_4 + K_2SO_4 + H_2SO_4$

Membrane: $2H+(anolyte) = 2H+(catholyte)$

Anode: $H_2O = 2H^+ + \frac{1}{2}O_2 + 2e$

Overall Reaction: $2KCr(SO_4)_2 + H_2O = 2CrSO_4 + K_2SO_4 + H_2SO_4 + \frac{1}{2}O_2$.

The hydrogen selenide product may be removed from the reduction medium, for example by contacting the reduction medium with a chemical species, such as a copper species, to carry out a precipitation reaction that forms an insoluble precipitate. The copper species may for example be a soluble copper salt and/or a copper containing oxide material. If the copper containing oxide material is CuO, the precipitation reaction may be carried out at a pH above 6 to form solid cupric selenide (CuSe), and the precipitation reaction may be carried out at a CuO/$H_2Se$ molar ratio of 10 or higher. If the copper containing oxide material is $Cu_2O$, the precipitation reaction may be carried out at pH 3.5 to form solid cuprous selenide ($Cu_2Se$), and the precipitation reaction may be carried out at a $Cu_2O/H_2Se$ molar ratio above 6. Wherein the soluble copper salt is copper sulfate ($CuSO_4$), the precipitation reaction may be carried out at pH above 4, to form the solid CuSe, and the precipitation reaction may be carried out at a $CuSO_4/H_2Se$ molar ratio above 6. The removal of the hydrogen selenide from the reduction medium may accordingly involve one or more of the following reactions:

$H_2Se + CuSO_4 = CuSe + H_2SO_4$ $H_2Se + CuO = CuSe + H_2O$ $H_2Se + Cu_2O = Cu_2Se + H_2O$.

Alternatively, the hydrogen selenide may be removed by from the reduction medium by sparging with a purging gas, such as $N_2$ or an inert gas. The sparged hydrogen selenide may for example be captured in a scrubbing reaction, which may involve reacting the sparged hydrogen selenide with $Cu_2O$ and/or CuO.

Chromic ions formed in the reduction medium by the oxidation of chromous ions may be removed from the reduction medium by a pH adjustment, for example by addition of a base to form an insoluble chromic hydroxide. The base may for example be sodium hydroxide or aqueous ammonia, and the pH adjustment to form the insoluble chromic hydroxide may accordingly involve the reaction:

$Cr_2(SO_4)_3 + 6NH_4OH = 2Cr(OH)_3 + 3(NH_4)_2SO_4$.

The insoluble chromic hydroxide may be recovered as a solid and re-dissolved with sulfuric acid. With an addition of potassium sulfate, the original solution for electrochemical synthesis can be re-generated:

$Cr(OH)_3 + 1.5H_2SO_4 + \frac{1}{2}K_2SO_4 = KCr(SO_4)_2 + 3H_2O$.

The $KCr(SO_4)_2$ product may be directed to a solution for electrochemical synthesis of regenerated chromous ions and the regenerated chromous ions may be recycled to the reduction reaction.

The reduction medium may be made up from an ion exchange eluant from an ion exchange process, with the selenate-barren solution recycled back to the ion exchange process. The ion exchange process may for example involve:

passing a primary aqueous solution comprising selenate over an anion exchange resin, such as a strongly basic resin, under conditions whereby the selenate binds to the resin to produce a selenate-loaded resin and an ion exchange discharge solution comprising a lower concentration of selenate than the primary aqueous solution; and, treating the selenate loaded resin with a regenerant solution comprising the selenate-barren solution under regenerating conditions whereby a second anion in the regenerant solution displaces selenate anions from the selenate-loaded resin to produce a selenate-laden regenerant solution having a higher concentration of selenate than the primary aqueous solution, wherein the selenate-laden regenerant solution is directed to form a component of the acidic reduction medium.

The primary aqueous solution may for example be a wastewater comprising dissolved sulphate, so that the second anion is sulphate.

The disclosed processes may for example be carried out essentially continuously. As such, systems are provided for continuously removing dissolved selenium species from an input water stream comprising a dissolved selenate, wherein the system removes the dissolved selenate by reduction of the dissolved selenate with chromous ions to form hydrogen selenide, wherein the chromous ions comprise recycled chromous ions produced by the system. As a result, such a system may be adapted to produce hydrogen selenide from the dissolved selenate.

DETAILED DESCRIPTION

Figure 1:
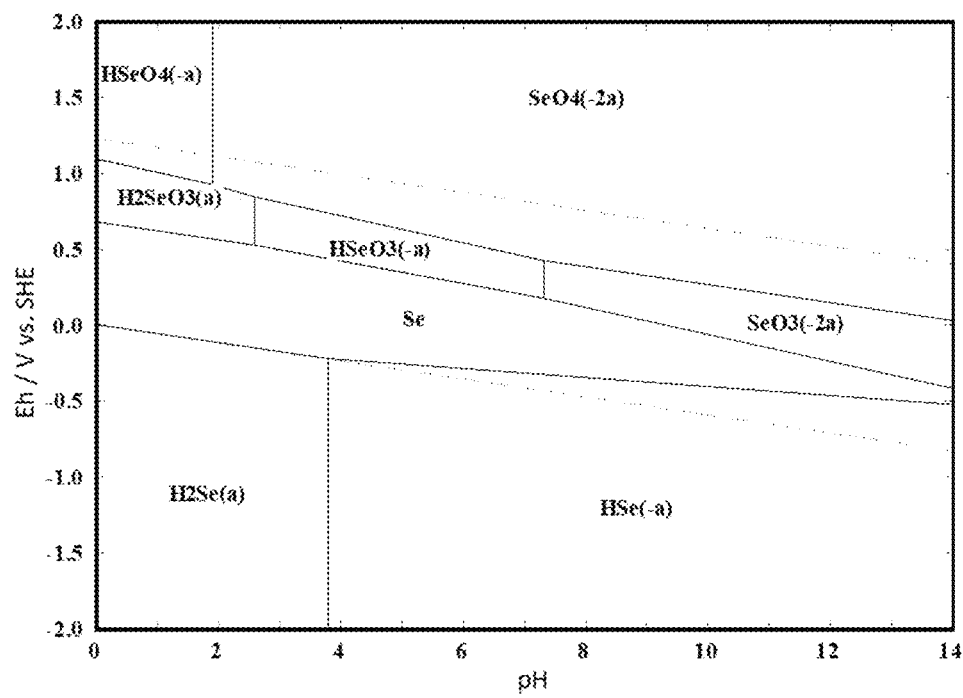
FIG. 1 is an Eh-pH diagram of selenium at 25° C. and selenium activity of $10^{-4}$ M. (derived from HSC Chemistry 6)

As disclosed in the following Examples, it has been discovered that the chromous ion can, surprisingly quickly and completely, reduce selenate and form hydrogen selenide as a reaction product. For use in this reduction process, chromous ions can for example be generated by chemical or electrochemical reduction of chromic solution. The resulting hydrogen selenide can be removed from solution, for example by further reaction with copper species. It has also been shown that the chromic ions formed by the reaction of chromous ions can be removed from solution by pH adjustment.

A solution of chromous ion can be prepared by chemical or electrochemical reduction. For example, a solution of potassium chromium(III) sulfate dodecahydrate (KCr(SO$_4$)$_2$·12H$_2$O) can be reduced in a divided electrochemical cell with a graphite felt cathode supported by a titanium mesh, a Nafion membrane separator between the anolyte and catholyte and an anode formed from a lead-silver alloy. The anolyte compartment contains sulfuric acid solution.

The main reactions in the electrochemical cell are:

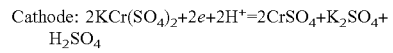

Cathode: $2KCr(SO_4)_2+2e+2H^+=2CrSO_4+K_2SO_4+H_2SO_4$

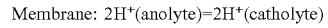

Membrane: $2H^+(anolyte)=2H^+(catholyte)$

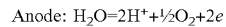

Anode: $H_2O=2H^++\frac{1}{2}O_2+2e$

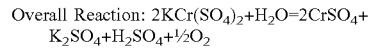

Overall Reaction: $2KCr(SO_4)_2+H_2O=2CrSO_4+K_2SO_4+H_2SO_4+\frac{1}{2}O_2$

The chemical reduction of selenate by chromous ions to form hydrogen selenide can be written in the following reaction (for example).

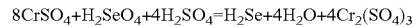

$8CrSO_4+H_2SeO_4+4H_2SO_4=H_2Se+4H_2O+4Cr_2(SO_4)_3$

The precipitation of selenide from solution may be accomplished by contact with a chemical species that forms an insoluble precipitation. For example a soluble copper salt or a copper containing oxide material may be used to react with selenide to form a copper-selenium precipitate. Some example reactions are shown below.

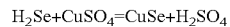

$H_2Se+CuSO_4=CuSe+H_2SO_4$

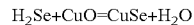

$H_2Se+CuO=CuSe+H_2O$

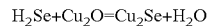

$H_2Se+Cu_2O=Cu_2Se+H_2O$

The precipitation of chromic ion from solution with base addition forms insoluble chromic hydroxide. Suitable bases may be (for example) sodium hydroxide or aqueous ammonia. Lime is generally not suitable as it forms calcium sulfate as a reaction product which contaminates the recovered chromic hydroxide.

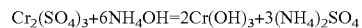

$Cr_2(SO_4)_3+6NH_4OH=2Cr(OH)_3+3(NH_4)_2SO_4$

The chromic hydroxide can be recovered as a solid and re-dissolved with sulfuric acid. With an addition of potassium sulfate, the original solution for electrochemical synthesis can be re-generated.

$$Cr(OH)_3 + 1.5H_2SO_4 + \tfrac{1}{2}K_2SO_4 = KCr(SO_4)_2 + 3H_2O$$

As exemplified herein, chromous ions are surprisingly efficient as a reducing agent for selenate removal from waste water. As one example of the application of the exemplified selenate removal process, BioteQ (BioTEQ, 2018) discloses an application with selenium in waste water before ion exchange (IX) treatment to recover selenate. In this process, the loaded ion exchange resin is eluted with a concentrated sulphate solution to produce an eluant containing Se as selenate. The eluant needs to be treated to remove selenium in order to recycle the eluant. The invention has been shown to be effective at removing selenate from an eluant of this kind.

Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Numeric ranges are inclusive of the numbers defining the range. The word "comprising" is used herein as an open-ended term, substantially equivalent to the phrase "including, but not limited to", and the word "comprises" has a corresponding meaning. As used herein, the singular forms "a", "an" and "the" include plural referents unless the context clearly dictates otherwise. Thus, for example, reference to "a thing" includes more than one such thing. Citation of references herein is not an admission that such references are prior art to the present invention. Any priority document(s) and all publications, including but not limited to patents and patent applications, cited in this specification are incorporated herein by reference as if each individual publication were specifically and individually indicated to be incorporated by reference herein and as though fully set forth herein. The invention includes all embodiments and variations substantially as hereinbefore described and with reference to the Examples and drawings.

EXAMPLES

In order to provide examples of the optional steps in alternative aspects of the present processes, a series of illustrative assays were conducted. Specific embodiments were exemplified to demonstrate (1) chromous generation using an electrochemical cell, (2) stoichiometry of the chromous reaction with selenate, (3) kinetics of selenate reduction with chromous, and (4) removal of hydrogen selenide from the solution using different reagents.

All chemicals used for the examples were reagent grade or higher grade without any further purification. In the chromous generation examples, potassium chromium(III) sulfate dodecahydrate ($KCr(SO_4)_2 \cdot 12H_2O$) from Alfa Aesar and 98% sulfuric acid from BDH were used to prepare catholyte and anolyte solutions. A Nafion N324 cation membrane from DuPont was used to separate catholyte and anolyte. A 6 mm thick graphite felt from CeraMaterials, USA was used as a cathode. Sodium selenate ($Na_2SeO_4$ 99%) from Sigma-Aldrich, sodium sulfate ($Na_2SO_4$) from Fisher Scientific, perchloric acid ($HClO_4$, 61.2%) from Fisher Scientific, sodium perchlorate ($NaClO_4 \cdot H_2O$ HPLC grade) from Fisher Scientific and sodium hydroxide from Fisher Scientific were used to prepare solutions for the kinetics study. Cupric oxide powder (CuO, 350 mesh) from Sigma Aldrich, cuprous oxide ($Cu_2O$, 75 μm or less) from Alfa Aesar and copper sulfate from Fisher Scientific were used for the hydrogen selenide removal examples.

$NR_4Fe(SO_4)_2 \cdot 12H_2O$ from Sigma-Aldrich was used to prepare ferric solution to oxidize chromous and hydrogen selenide to chromic and selenium, respectively. Standard cerium (IV) sulfate (0.1N) solution from Alfa Aesar was used to titrate ferrous ion from this reaction as an indirect indication of the content of chromous or hydrogen selenide reacted. Ultra-high-purity argon 99.999% Ar (<3 ppm $O_2$) was used to purge the reactors and solutions to remove oxygen that would be expected to react with chromous and impact the reaction chemistry and kinetics.

Example 1. Generation of Chromous Ions

The electrochemical generation of chromous ions was conducted to produce chromous solution for the selenate reduction examples. The current efficiency and the energy consumption of reduction of chromic to chromous as a function of time was calculated.

Figure 2:
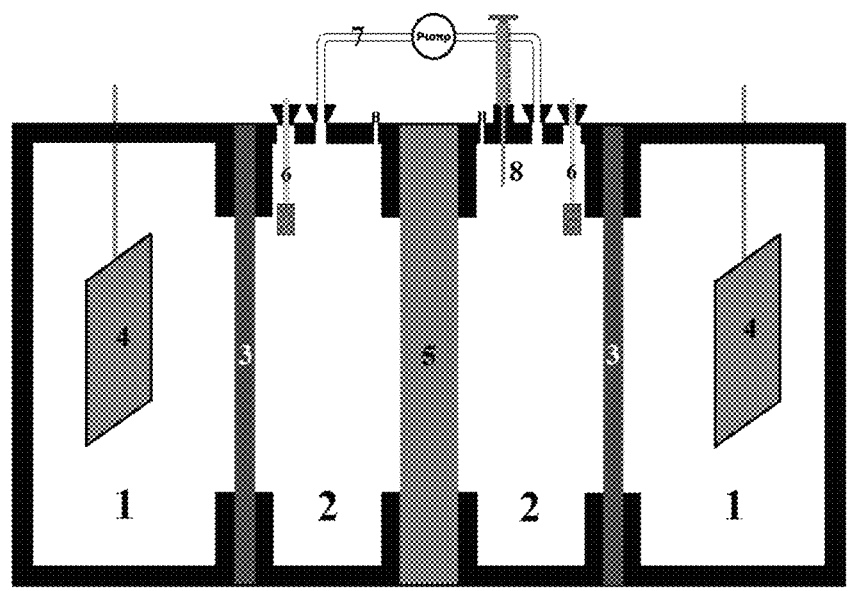
FIG. 2 is a schematic illustration of the exemplified setup for generation of chromous solution. 1) Anode compartment, 2) Cathode compartment, 3) Cation exchange membrane, 4) Anode electrode, 5) Cathode electrode, 6) Argon sparging inlet, 7) Circulation tube, 8) Sampling port.

Chromous solution was generated by the electrochemical reduction of Cr(III) in a three compartment cell with two anode compartments and one cathode compartment as shown in FIG. 2.

The electrochemical cell consisted of four blocks and was constructed entirely of chlorinated polyvinyl chloride sheets. The anode and cathode chambers had a capacity of 500 ml (each anode) and 1 L, respectively. The cathode compartment was equipped with three ports that were used for purging argon gas, circulating the catholyte in the cathode compartment and collecting the generated chromous solution into a storage container. The circulation of chromous solution through the cathode was performed using a Masterflex pump at a rate of 100 mL/min to enhance the mass transfer. The superficial surface area of each of the anodes and the cathode were 114 cm².

Two titanium mesh frames were used to support and compress the graphite felt between the two cathode compartments and to conduct electricity to the graphite felt. The titanium surface was painted using a chemical-resistant paint except for the electrical contact area with the graphite felt. This was used to reduce the rate of formation of hydrogen on the titanium surface.

A Nafion N324 cation membrane (DuPont Inc.) was used to separate the catholyte and anolyte. Two lead-silver alloy electrodes (1% Ag) were used as anodes while a 6-mm thick graphite felt electrode (CeraMaterials, USA) was used as a cathode. The graphite felt cathode was first washed using deionized water to remove any dust and then dried in the oven at 110° C. for 24 hours to activate the graphite surface (Hong, 2015; Sun and Skyllas-Kazacos, 1992).

The anolyte was prepared as a 0.1 M sulfuric acid solution using concentrated sulfuric acid solution and DI water. The catholyte contained 0.1M chromium (III) and 0.1 M sulfuric acid solution and was prepared using $KCr(SO_4)_2 \cdot 12H_2O$ and sulfuric acid.

Each anode compartment was filled with the prepared anolyte solution using a volumetric cylinder. The catholyte was transferred into the cathode compartment using a peristaltic pump. The catholyte was purged with ultra-pure argon gas at least for half an hour to remove oxygen from the solution and headspace of the cell before starting the assay. A slow flow of argon gas was maintained across the headspace of the cell during the example to minimize oxygen ingress. A DC power supply from GW Instek was used to apply a current density of 200 A/m² to the graphite felt. A logging multimeter and a standard resistor (5 A, 100 mV) were used to ensure that the currents flowing through the two anodes were the same. The electrolysis time was sufficiently long to ensure that almost all $Cr^{3+}$ was converted to $Cr^{2+}$. The generated chromous solution with the concentration of 0.1 M $Cr^{2+}$ and 0.15 M of $H_2SO_4$ was then transferred into a glass container using a peristaltic pump under an argon gas atmosphere. The chromous solution was stored in a glass container under argon atmosphere to ensure no oxidation of chromous ions occurred by air ingress. The analysis of this solution after one months of storage showed that the chromous concentration did not change.

The concentration of generated chromous solution was measured by the potentiometric titration method using Radiometer ABU 80 automatic burette. A known mass of chromous solution was mixed with a known mass of 0.15 M ferric solution under an argon atmosphere. The ferric solution was made by dissolving $(NH_4)Fe(SO_4)_2 \cdot 12H_2O$ salt into 2 M sulfuric acid solution and then purging with argon gas for 30 minutes to remove oxygen before introducing the chromous solution into it. Mixing with ferric solution, Cr(II) was converted to Cr(III) while Fe(III) was reduced to Fe(II), as shown below. The concentration of ferrous ions was determined by titration with Ce(IV) as shown below.

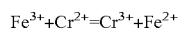
$$Fe^{3+}+Cr^{2+}=Cr^{3+}+Fe^{2+}$$

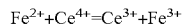
$$Fe^{2+}+Ce^{4+}=Ce^{3+}+Fe^{3+}$$

The endpoint was indicated by addition of one drop of ferroin ($5 \times 10^{-6}$ M) into the solution. Blank titration was used to correct for indicator error.

The current efficiency of chromic reduction in 0.1 M sulfuric acid medium was investigated under the conditions summarized in Table 1.

TABLE 1

| Conditions for the electrochemical reduction of Cr(III) to Cr(II) | |
| --- | --- |
| Temperature | 25° C. |
| Current density | 200 A/cm² |
| Cathode thickness | 6 mm |
| Catholyte | 0.1M fresh $KCr(SO_4)_2$ + 0.1M $H_2SO_4$ |
| anolyte | 0.1M $H_2SO_4$ |

Figure 5:
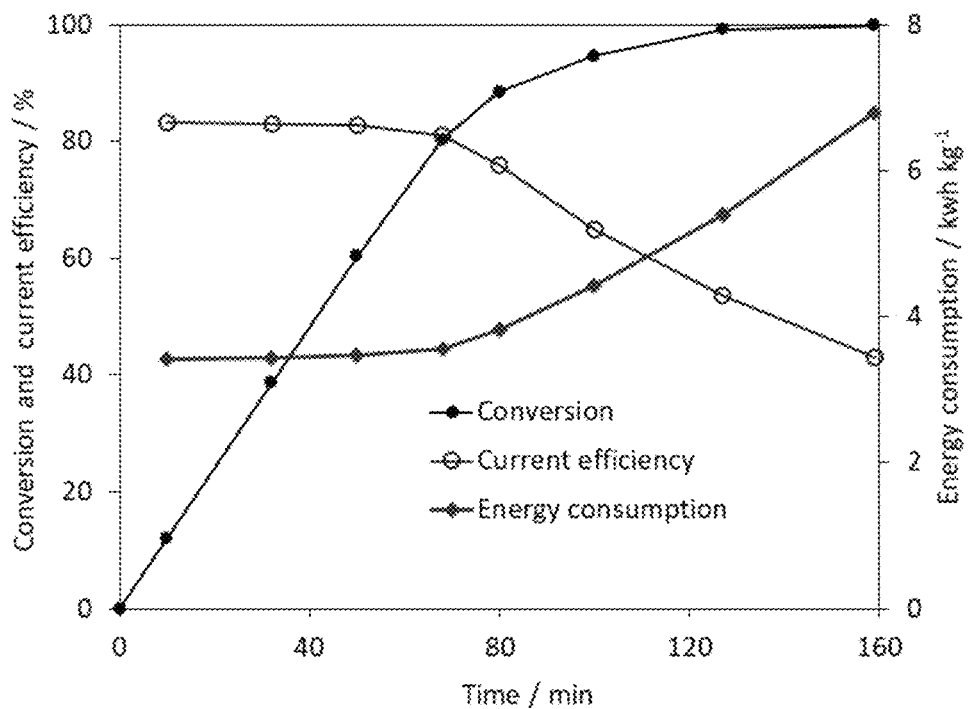
FIG. 5 is a line graph illustrating current efficiency and conversion of Cr(III) to Cr(II) as a function of time. Initial catholyte: 0.1 M Cr(III) as sulfate and 0.05 M $K_2SO_4$ and 0.1M $H_2SO_4$.

The conversion and current efficiency of Cr(III) to Cr(II) as a function of time are shown in FIG. 5. In the first 50 minutes, the conversion of Cr(III) to Cr(II) almost linearly increased to 60% while the current efficiency only decreased from 83.3 to 82.9%. After 50 minutes, the conversion of Cr(III) to Cr(II) increased slowly and reached almost 100% at 160 minutes. The current efficiency decreased from 82.9% to 43% with increasing time from 50 to 160 minutes. The energy consumption first increased slowly (from 3.41 to 3.83 kWh/kg in 80 minutes) as the current efficiency decreased slightly and then increased significantly with decreasing current efficiency. It finally reached 6.89 kWh/kg. In the conversion range of 80 to 90% which is sufficient for industrial applications, the current efficiency was 81 to 76% while the energy consumption was 3.5 to 3.83 kWh/kg.

Example 2. Selenate Reduction by Chromous Ions

The stoichiometry of the selenate reduction reaction by chromous ions was investigated at different initial concentrations of chromous ions and selenate and different pHs. All the assays were performed at room temperature. The initial chromous concentration in all tests was 0.05 M and the molar ratio of chromous ions to selenate was adjusted by varying the initial concentration of selenate ions.

Figure 3:
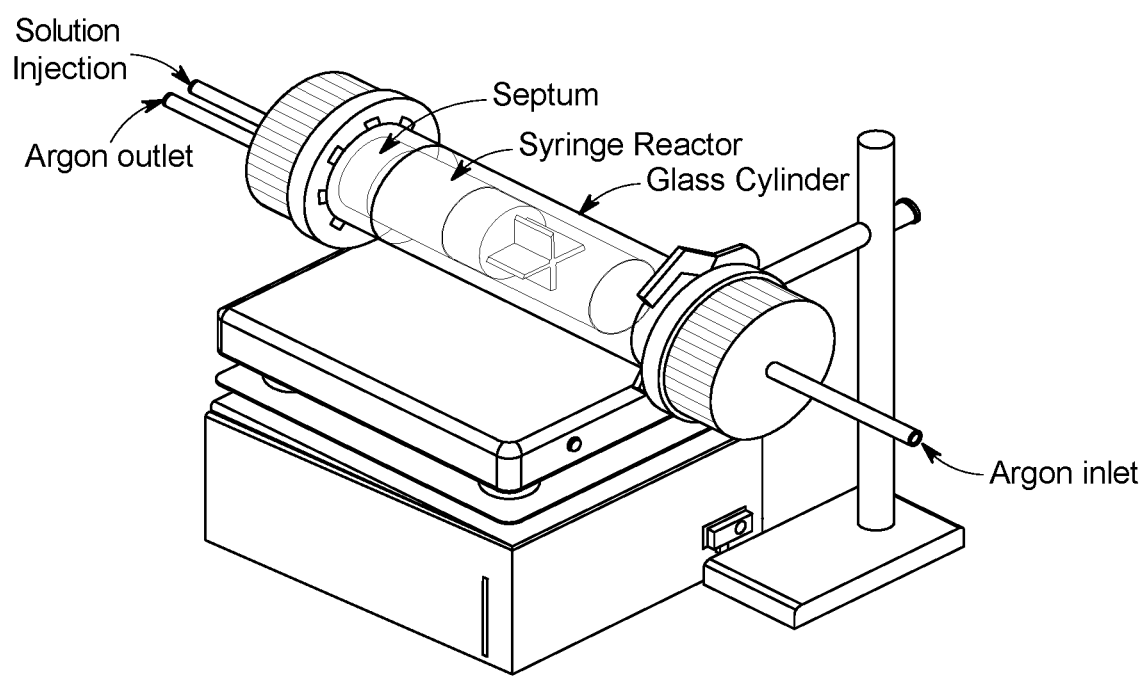
FIG. 3 is a schematic illustration of a stoichiometry example set-up.

To perform each stoichiometry example, a 60 mL syringe with its top sealed with a septum was used as a reactor. The schematic illustration of the set-up is shown in FIG. 3. The sealed syringe was chosen as a reactor to ensure that there was no free headspace in the reactor to allow hydrogen selenide gas to escape from the solution into the headspace. A magnetic stirring bar was placed in the syringe to agitate the solution. Prior to starting the examples, the syringe reactor was flushed with argon gas to remove the air and then placed in a glass cylinder. Both the head and bottom of the glass cylinder were sealed with threaded plastic caps and a slow flow of argon was maintained across the cylinder during the exemplified assay. Argon gas was passed through the glass cylinder to prevent possible diffusion of oxygen into the syringe and subsequently to prevent the possible oxidation of chromous ions and $H_2Se$ by oxygen.

The selenate solutions were prepared by dissolving $Na_2SeO_4$ in deionized water at the desired concentrations and then purging with ultra-high purity argon gas for 30 minutes to remove oxygen from the solution. Sodium sulfate and sulfuric acid were also added as required to ensure the solution pH reached the required value.

To conduct a selenate reduction example, a 60-mL reactor syringe was first flushed with ultra-high purity argon gas and then filled with a known mass of chromous solution through the septum. A known amount of selenate solution was then quickly injected into the syringe reactor through the septum and rapidly mixed with the chromous solution using a magnetic stirring bar. The solutions were added on a mass basis using a sealed container to minimize the oxidation of the chromous ions in contact with air. The densities of all the solutions were measured before and after purging argon gas to calculate the volumes of the transferred solutions.

A series of samples were taken for Cr(II), $H_2Se$ and Se(VI) analysis. For the examples with an initial molar ratio of Cr(II)/Se(VI) over 8 (i.e., an excess of Cr(II) present), half of each sample was immediately mixed after collection with a known mass of 0.3 M ferric sulfate and 2 M sulfuric acid solution to convert both Cr(II) and $H_2Se$ to Cr(III) and Se, respectively, while Fe(III) was reduced to Fe(II). The total concentration of $H_2Se$ and Cr(II) was analyzed by titration of produced Fe(II) with Ce(IV) using a Radiometer ABU 80 automatic burette. The other half of the sample was immediately mixed with a sufficient amount of 10 M NaOH. The Cr(II) was precipitated as $Cr(OH)_2$ while $H_2Se$ was converted to $HSe^-$ and $Se^{2-}$. In the acidic solution, the redox potential of $H^+/H_2$ is 0.42 V higher than that of $Cr^{2+}/Cr^{3+}$. However, hydrogen ions do not react with chromous ions because their reaction is kinetically inhibited. This is consistent with the work by Jalan et al. (Jalan et al., 1985). However, at a high pH, chromous ions were precipitated as $Cr(OH)_2$ and then reacted with water to generate hydrogen gas. The hydrogen evolution was much faster in the presence of $H_2Se$, indicating that the reaction was catalyzed by $H_2Se$.

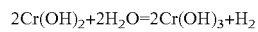
$$2Cr(OH)_2+2H_2O=2Cr(OH)_3+H_2$$

After collecting all produced hydrogen gas, 5 M $H_2SO_4$ solution was then added to the mixture to dissolve chromic hydroxides and convert $HSe^-/Se^{2-}$ back to $H_2Se$ species. The resulting solution, now free of chromous ions, was mixed with a known mass of ferric solution. Mixing with ferric solution, $H_2Se$ was immediately converted to elemental Se, while $Fe^{3+}$ was reduced to $Fe^{2+}$. The solution was filtered through an Osmonics nylon 0.1 μm filter to remove elemental selenium and then the filtrate was analyzed for ferrous concentration by the titration with $Ce^{4+}$ using a Radiometer ABU 80 automatic burette. The concentration of chromous ions was calculated using the difference of the two measurements. The concentration of the remaining selenate in the solution was measured using ICP-OES.

The stoichiometry of selenate reduction by chromous ions was investigated at various initial molar ratios of chromous ions to selenate ions (from 9:1 to 43:1). The initial chromous concentration in all tests was 0.05 M and the molar ratio of chromous ions to selenate was varied by changing the concentration of selenate ions. All the exemplified assays were conducted at pH 1 (except where noted), and 20° C.

Figure 6:
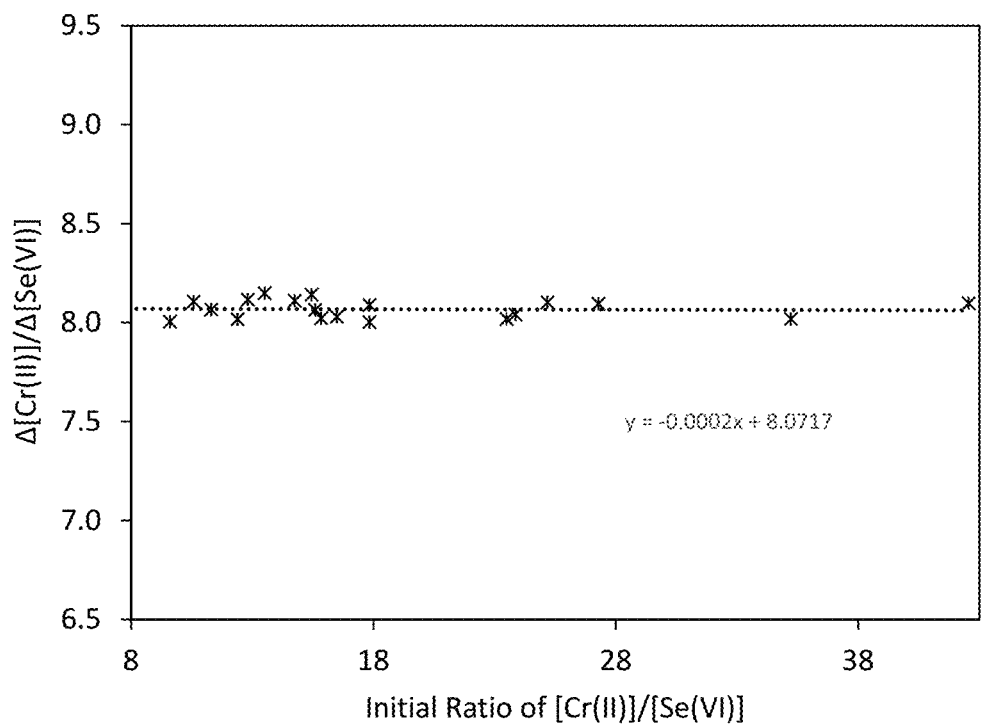
FIG. 6 is a line graph illustrating the stoichiometry of the selenate reduction with chromous ions at pH 1 and 20° C.

As shown in FIG. 6, the average stoichiometric ratio of chromous ions to selenate was 8.07. With the consideration of experimental errors (e.g., the oxidation of chromous ions by oxygen), slightly more chromous ions were consumed. Therefore, the putative overall reaction is written below.

$$SeO_4^{2-} + 8Cr^{2+} + 10H^+ = H_2Se + 4H_2O + 8Cr^{3+}$$

Example 3. Kinetics of Selenate Reduction with Chromous Ions

The kinetics of selenate reduction by chromous ions were demonstrated by varying the concentration of chromous ions, pH, sulfate concentration, ionic strength and temperature. All kinetics examples were conducted using a stopped-flow apparatus.

To study the kinetics of a reaction, the time required to mix the reagents of the reaction should be negligible compared with the reaction time. Since the reaction of chromous ions with selenate is very fast under some conditions, the stopped-flow technique was used to study the reduction of selenate by chromous ions. A stopped-flow device is an apparatus for the rapid mixing of two solutions. Using the stopped-flow technique, the solutions are first forced from syringes into a mixing chamber. After several milliseconds, the observation cell is filled by a piston linked to a sensing switch that triggers the measuring device (e.g., a spectrometer) and the flow is stopped suddenly. Since commercial stopped-flow instruments are very expensive and usually used for mixing very small volumes of solutions (usually less than 1 mL), the stopped-flow device shown in FIG. 4 (the schematic illustration) was fabricated for testing.

In this example, a UV-spectrometer was initially used to monitor the concentrations of Cr(II) and Cr(III) ions in the solution. A large background interference with the detection of Cr(II) and Cr(III) by UV was observed, which was most likely due to the formation of $H_2Se$. Therefore, the ICP-OES analysis was used for analyzing the selenate concentration. A series of samples had to be taken and a large volume of solution (about 50 mL) was needed in each test, which was larger than the capacity of commercially available stopped-flow devices. Using the designed stopped-flow device (FIG. 4), 30 mL of chromous solution was mixed with 30 mL of selenate solution to produce 60 mL of mixed solution, providing enough solution samples.

Figure 4:
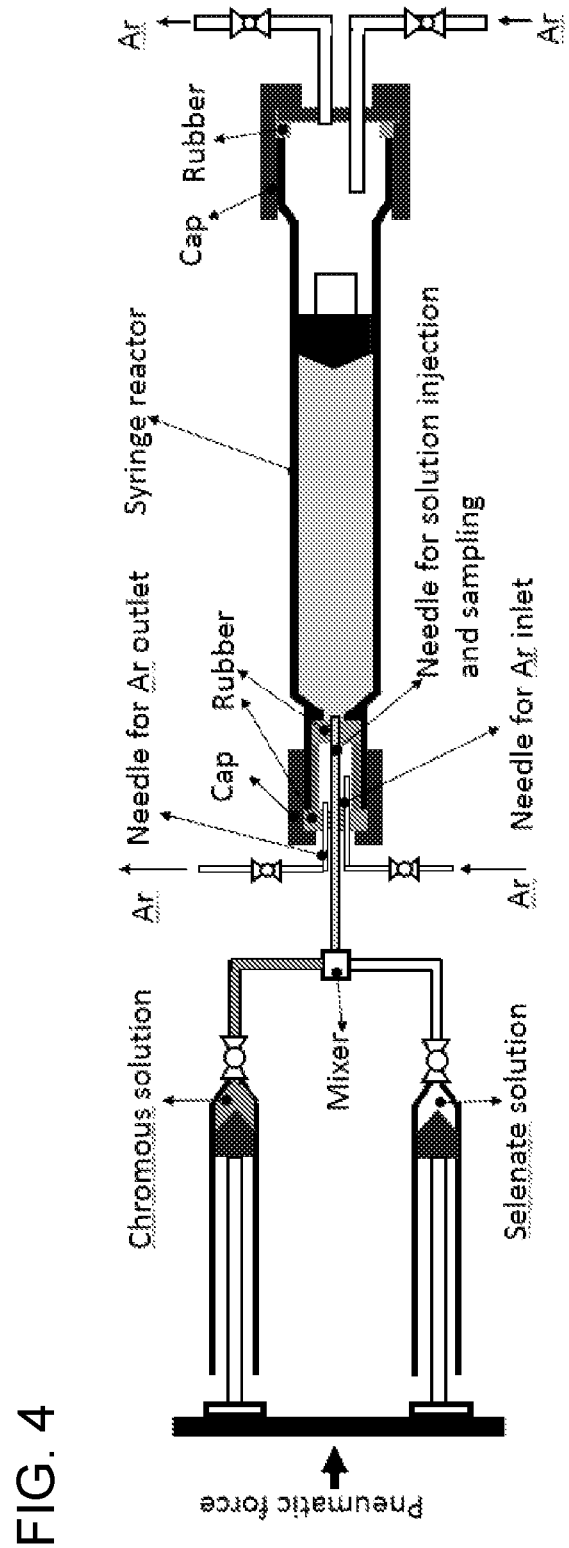
FIG. 4 is a schematic illustration of a Stopped-Flow setup used in kinetics examples.

As shown in FIG. 4, with the use of a pneumatic cylinder, equal volumes of selenate and chromous solutions were driven from syringes into a mixer in less than 5 s and then the mixture immediately flowed into a glass syringe reactor to initiate the reaction. The head and bottom of the glass syringe reactor were sealed and also purged with argon to eliminate oxygen ingress and subsequent oxidation of chromous ions and $H_2Se$ by oxygen. All the tubing connected to the reactor were flushed with argon gas prior to running the exemplary embodiment in order to minimize oxygen in the system. The syringe reactor was immersed in a water bath to maintain a constant temperature.

Prior to running each exemplary embodiment, the syringes containing selenate and chromous solutions and sampling syringes were placed in glass containers filled with deoxygenated water under an argon atmosphere. The glass containers were immersed for over 30 minutes in the water bath to ensure that the temperature of two solutions stabilized at the target value before initiating the reaction.

Sampling from the solution was accomplished by applying a positive pressure of argon gas to the reactor and forcing the solution to flow through a needle into a glass tube containing a known mass of approximately 0.3 M ferric solution to stop the reactions. The glass tube was flushed with argon gas before introducing the sample to remove oxygen. The ferric solution was also deaerated with argon gas for 1 hour or longer before mixing with the sample. The mixture of the sample and ferric solution was shaken and heated to about 60° C. to accelerate the oxidation of $H_2Se$ with ferric ions. The selenium concentration of each sample was determined by ICP-OES analysis. Selenate solution was prepared according to the required solution composition using sulfuric acid, perchloric acid, sodium perchlorate and sodium sulfate. Considering the method detection limit of ICP-OES for selenium (>100 ppb), the initial selenate concentration was selected as 0.00022 M (17 ppm) so that when 99% or less of selenate is removed from the solution, the selenate concentration can still be accurately determined. Despite the fact that a higher initial selenate concentration is better for the determination of selenate concentration by ICP-OES, at a higher concentration of selenate, the concentrations of chromous and hydrogen ions will change more as the reaction proceeds and they cannot be considered to be constant. The concentration of chromous was also chosen at a sufficiently high value compared to the selenate so that the chromous concentration can be considered as constant when selenate is completely consumed. The $HSO_4^-/SO_4^{2-}$ system was used as a pH buffering pair to maintain a constant pH over the course of reaction. Sodium perchlorate was added to maintain a constant ionic strength.

The selenate solution was purged with ultra-high purity argon for 30 minutes to remove oxygen from solution before mixing with the chromous solution. The chromous solution for each exemplary assay was made as needed by diluting the original chromous solution, 0.1 M Cr(II) (in stock), with deoxygenated deionized water in a 50-mL flask while purging the headspace of the flask with ultra-high purity argon gas to maintain the oxygen-free atmosphere. Based on the chromous solution composition (i.e., sulfate and proton concentrations), the selenate solution was prepared in such a way that the initial composition of the mixture reached the targeted value. The concentrations of all the solutions were validated by chemical analysis (ICP-OES and titration), and in all cases agreed well with the theoretical dilution values.

Figure 7:
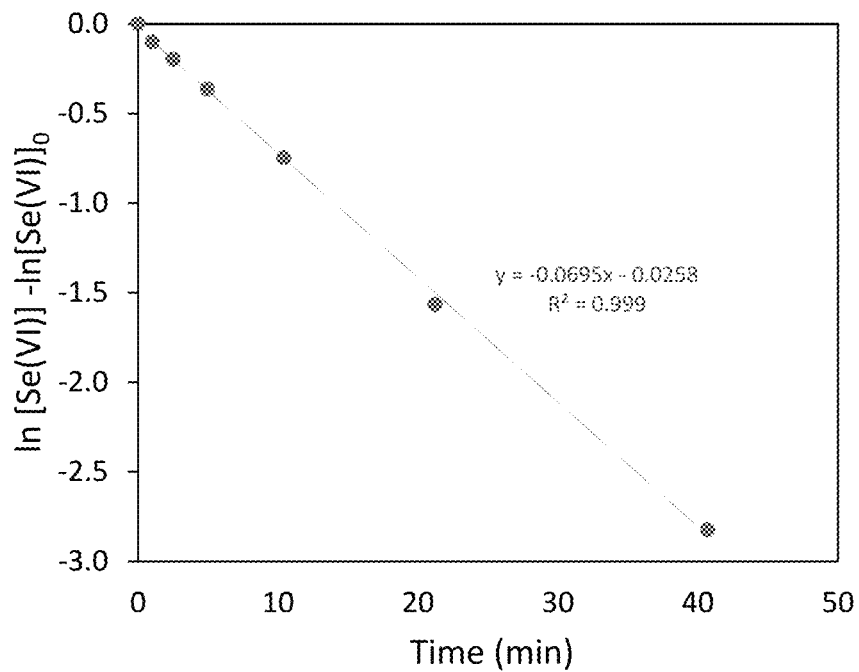
FIG. 7 is a line graph illustrating In [Se(VI)]−In [Se(VI)]$_0$ concentration as a function of time at $[Cr(II)]_0$=0.047 M, $[Se(VI)]_0$=0.00022 M, 20° C., and an ionic strength of 1 M.
Figure 8:
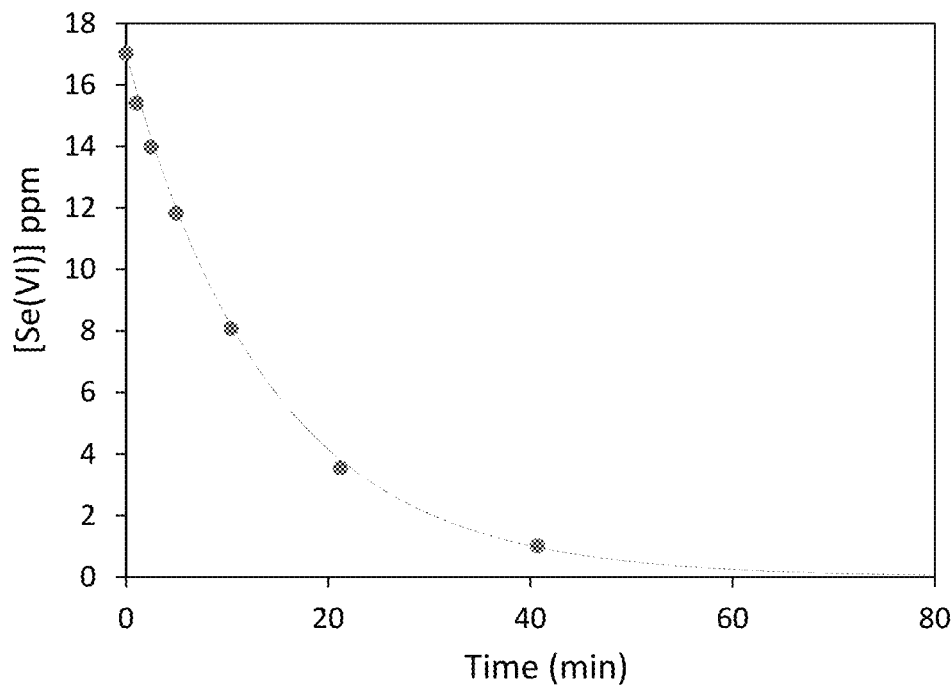
FIG. 8 is a line graph illustrating selenate concentration as a function of time at $[Cr(II)]_0$=0.047 M, $[Se(VI)]_0$=0.00022 M, pH 1.0, 20° C., and an ionic strength of 1 M.

FIG. 7 shows a plot of ln ($[Se(VI)]/[Se(VI)_0]$) against time. The plot is linear with a slope of $-0.0695$, indicating that the reaction order with respect to selenate concentration is 1. The selenate concentration as a function of time is shown in FIG. 8. The selenate concentration decreased from 17 ppm to 1 ppm in 40 minutes.

Figure 9:
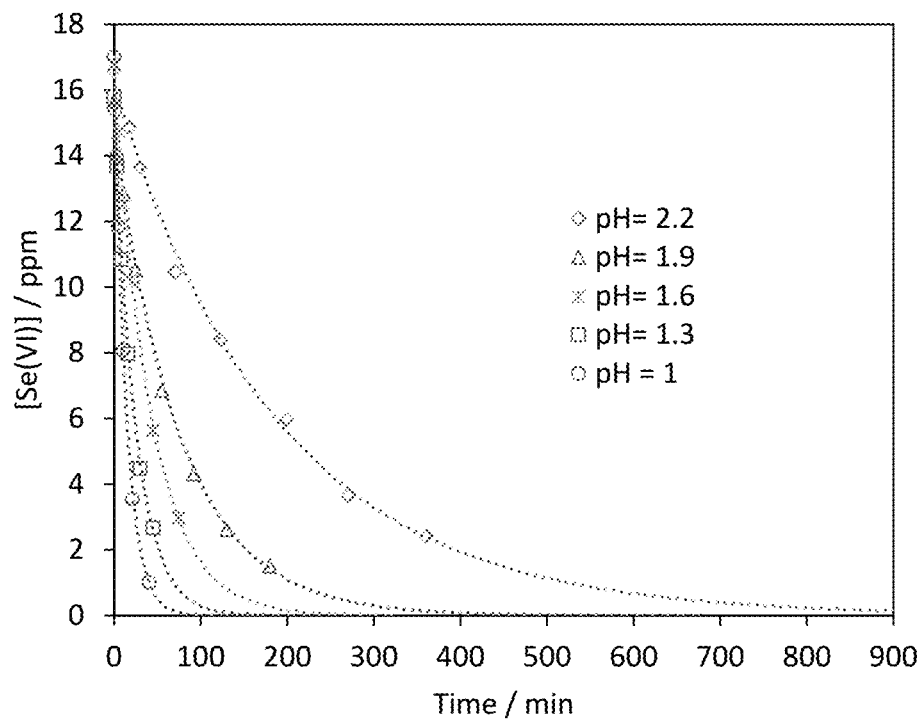
FIG. 9 is a line graph illustrating selenate concentration as a function of time at different pH, $[Cr(II)]_0$=0.047 M, $[Se(VI)]_0$=0.00022 M, 20° C. and an ionic of strength of 1 M.

The selenate concentration as a function of time at pH 1.0, 1.3, 1.6, 1.9 and 2.2 are shown in FIG. 9.

Figure 10:
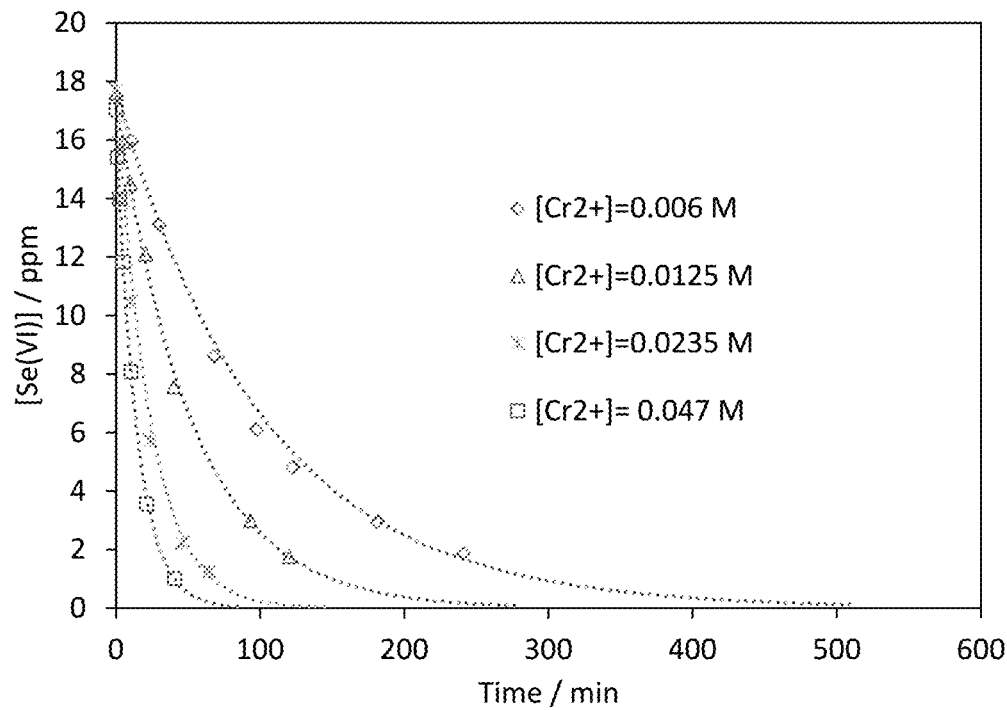
FIG. 10 is a line graph illustrating selenate concentration as a function of time at different chromous concentrations, pH 1.0, 20° C., an initial selenate concentration of 0.00022 M and an ionic strength of 1 M.

The selenate concentration as a function of time at different chromous concentrations are given in FIG. 10.

Figure 11:
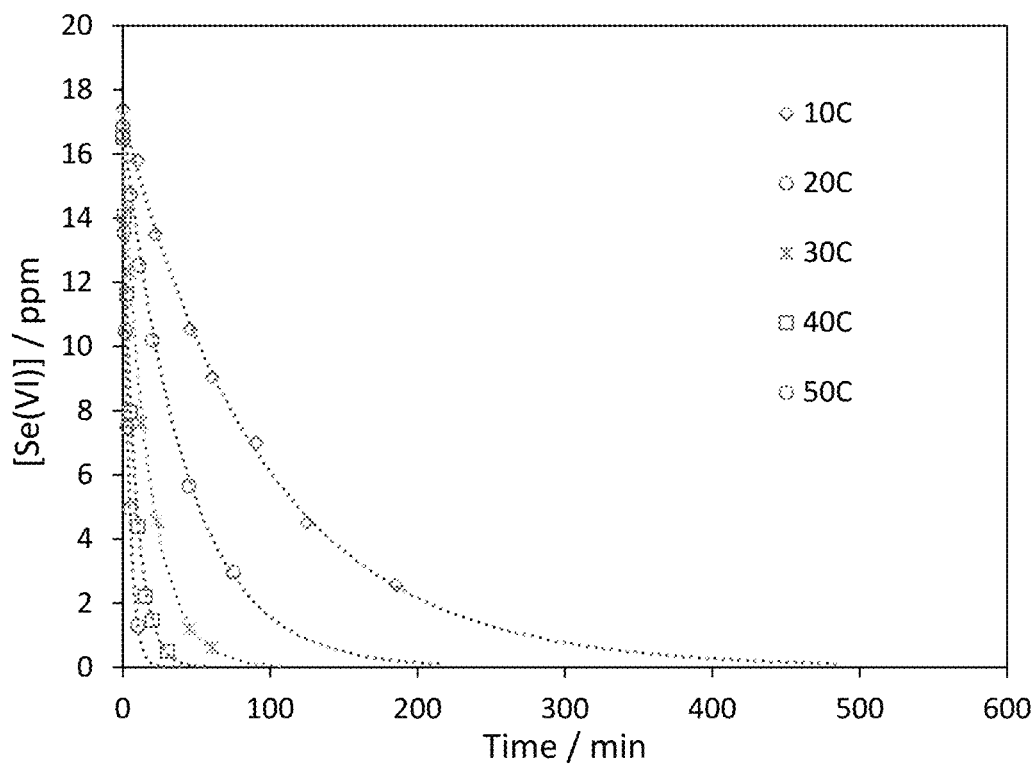
FIG. 11 is a line graph illustrating selenate concentration as a function of time at different temperatures, pH 1.6, 0.047 M Cr(II), an initial selenate concentration of 0.00022 M and an ionic strength of 1 M.

The selenate concentration as a function of time at various temperatures is shown in FIG. 11.

Figure 12:
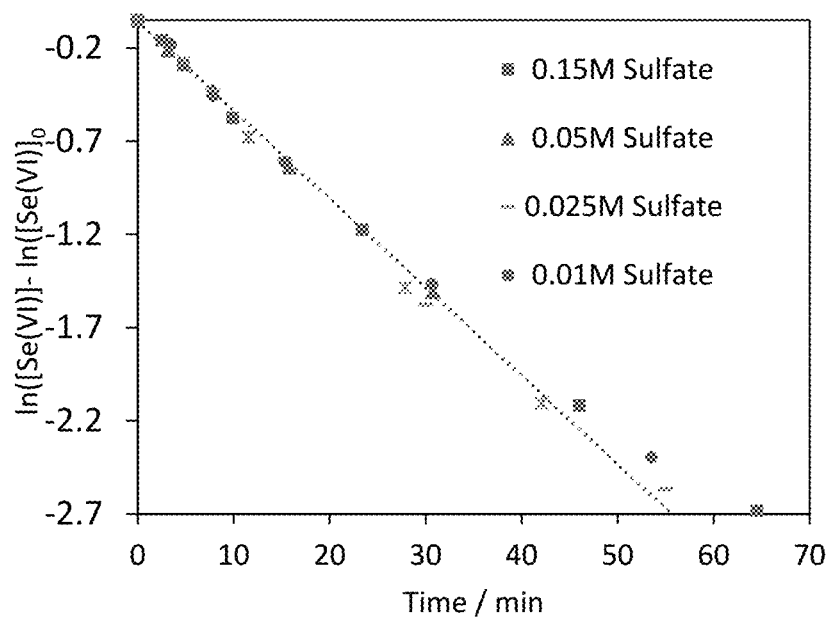
FIG. 12 is a line graph illustrating In([Se(VI)]−In([Se(VI)]$_0$ as a function of time and different sulfate concentrations at $[Cr(II)]_0$=0.026 M, $[Se(VI)]_0$=0.00022 M, 20° C. pH 1 and an ionic of strength of 1 M.

The effect of sulfate on the rate of selenate reduction by chromous ions was investigated by varying the concentration of sulfate from 0 to 0.15 M at a chromous concentration of 0.026 M, selenate concentration of 0.00022 M, an ionic strength of 1, pH=1 and at 20° C. The plots of ln([Se(VI)]-ln([Se(VI)]$_0$ against time at different sulfate concentrations (FIG. 12) give straight lines which virtually overlapped.

Since the kinetics data also show that chromous ions does not reduce sulfate, the use of chromous ions may be useful for the selective removal of selenate in high sulfate concentration solutions.

In the use of ion exchange for selenate adsorption, the selenate-containing eluant can have a significant sulfate concentration (e.g. 1 M sodium sulfate or 1 M ammonia sulfate). Therefore, it is necessary to conduct the selenate reduction by chromous ions in the solution containing higher sulfate concentrations. At pH above 2.2, the selenate reduction is very slow. However, at a pH below 2.2, more sulfuric acid has to be used to adjust the pH to a lower value. Hence the selenate reduction was carried out at pH 2.2, an initial chromous concentration of 0.047 M, and an initial selenate concentration of 0.00022 M, and 20° C.

Figure 13:
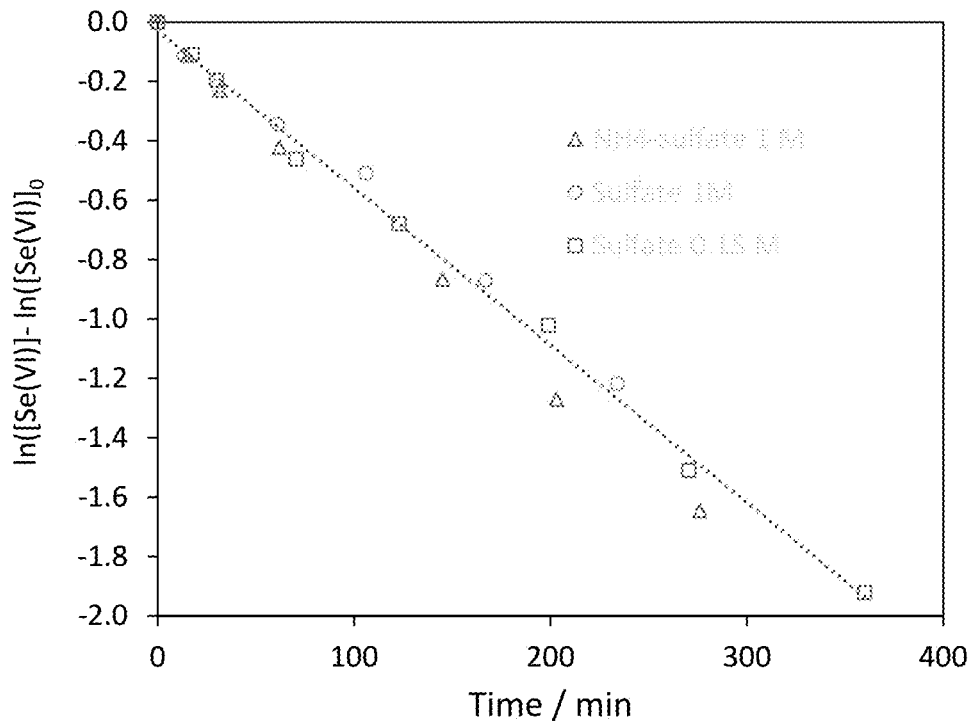
FIG. 13 is a line graph illustrating In([Se(VI)]−In([Se(VI)]$_0$ as a function of time and different sulfate concentrations at $[Cr(II)]_0$=0.047 M, $[Se(VI)]_0$=0.00022 M, 20° C. and pH 2.2.

The plots of ln([Se(VI)]-ln([Se(VI)]$_0$ against time at different sulfate concentrations (FIG. 13) give linear lines which virtually overlapped.

Example 4. Hydrogen Selenide Removal from Solution

Selenate is reduced to selenide using chromous ions, which forms hydrogen selenide in the acidic solution (pH<4). Therefore, the produced hydrogen selenide needs to be removed from the solution. All exemplified embodiments of hydrogen selenide removal were carried out in a similar manner. The hydrogen selenide solution was first produced by the reduction of selenate by chromous ions and then CuO or Cu$_2$O solids or CuSO$_4$ solution were introduced to the solution to remove H$_2$Se from the solution as CuSe or Cu$_2$Se.

A typical example first involved transferring of previously produced chromous solution into a reactor. A known amount of selenate solution was mixed with the chromous solution. The chromous ions were present in a quantity slightly higher than stoichiometrically required to completely reduce selenate ions to hydrogen selenide so that there was nearly no chromous ion left in the solution after the completion of the reactions.

To measure the concentration of produced hydrogen selenide, a sample was collected at the end of each reduction example and mixed with a sufficient amount of 10 M NaOH to precipitate any remaining Cr(II) as Cr(OH)$_2$ and convert H$_2$Se to HSe$^-$ and Se$^{2-}$. Cr(OH)$_2$ reacts with water to produce Cr(OH)$_3$ and H$_2$. A 5 M H$_2$SO$_4$ solution was added then to the mixture to dissolve chromic hydroxides and convert HSe$^-$/Se$^{2-}$ back to H$_2$Se species. The resulting solution, now free of chromous ions, was mixed with a known mass of ferric solution to measure the concentration of H$_2$Se through titration with Ce$^{4+}$ as explained previously. The concentration of the remaining selenate in the solution was measured using ICP-OES.

A typical hydrogen selenide removal example was conducted by transferring 25 ml of previously produced hydrogen selenide solution into a sealed vessel, typically a 30-mL Pyrex bottle. The vessel contained three openings: one for addition of NaOH, CuO slurry, Cu$_2$O slurry or copper sulfate solution depending on the test, the second one for the pH probe, and the third one for purging argon gas. The reactor was first purged with argon gas to remove air and then a small pressure of argon gas was maintained in the reactor.

The solution pH was adjusted to a desired value by adding deoxygenated 0.1 M NaOH at the beginning of the exemplified assay, as required. The pH was recorded at the beginning and end of each example. The examples were conducted under constant agitation using a magnetic stirrer and at room temperature.

In order to create a slurry of copper oxide powder, 0.5 g of CuO or Cu$_2$O was mixed with 50 mL of deionized water in a sealed container and then the slurry was purged with argon gas for 30 minutes or longer. To ensure homogeneity of the slurry was added to the reactor, a known amount of slurry was collected from the container using a 5-mL syringe while it was rapidly stirred. Immediately following addition of the copper oxide slurry, several samples were taken using a syringe to monitor the concentration of hydrogen selenide left in the solution. The samples were filtered through an Osmonics nylon 0.1 µm filter to remove solid particles and then the filtrate was analyzed for hydrogen selenide concentration by titration. Solids were collected using a membrane filtration system and washed with deionized water and dried in air for x-ray diffraction (XRD) analysis. All the examples were performed at room temperature.

Figure 14:
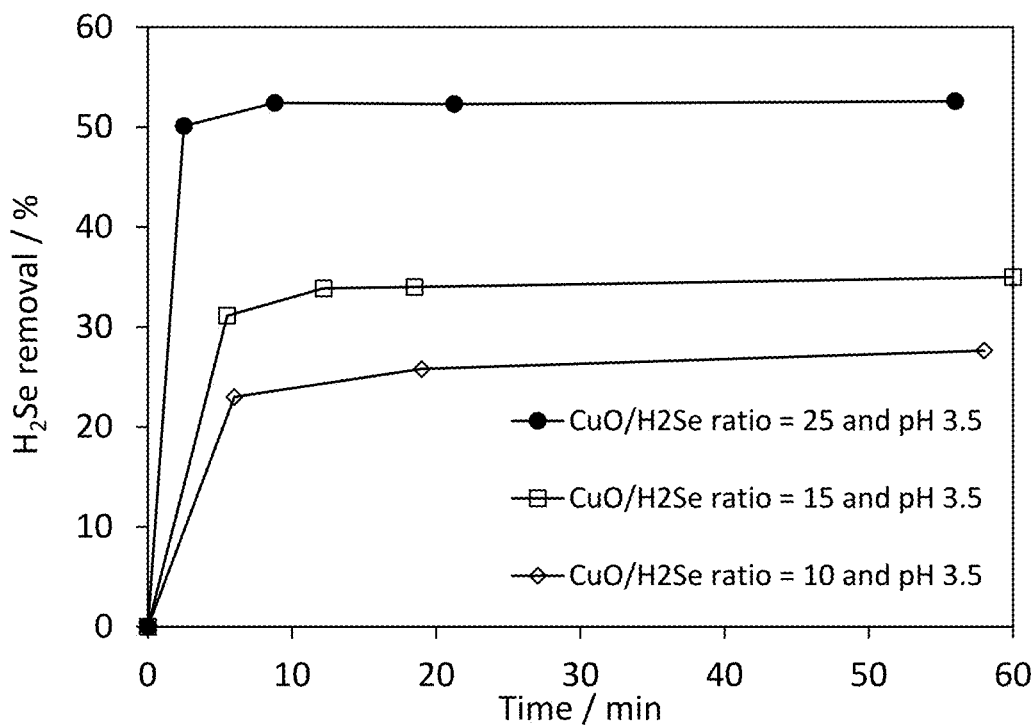
FIG. 14 is a line graph illustrating hydrogen removal as a function of time at CuO/$H_2$Se ratios of 10, 15 and 25, an initial $H_2$Se concentration of 0.0022 M, 20° C. and pH 3.5.
Figure 15:
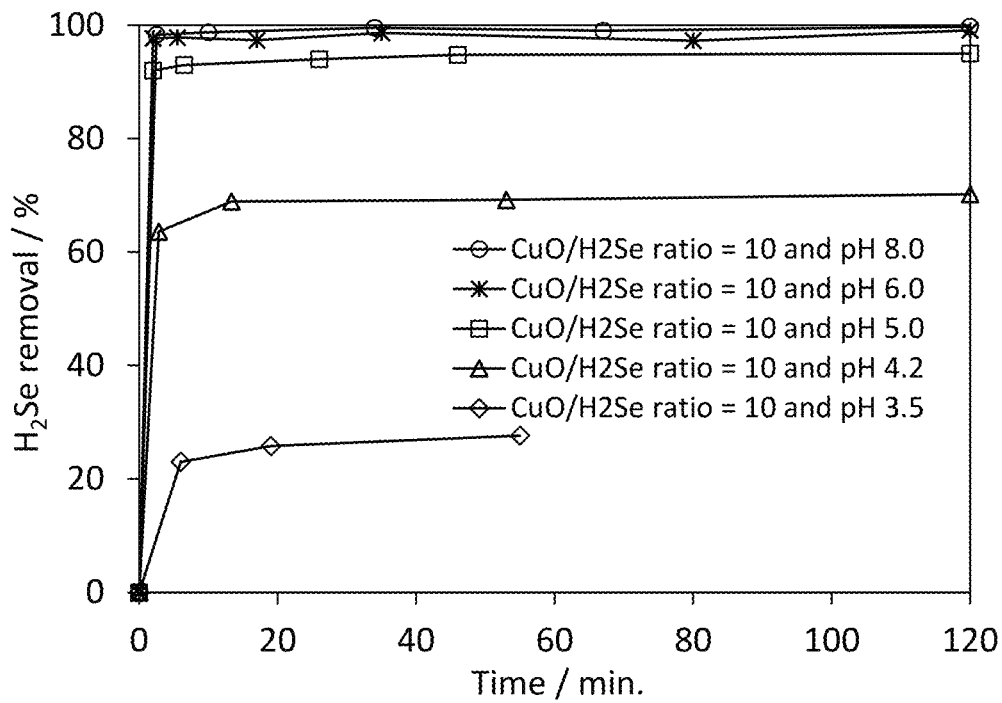
FIG. 15 is a line graph illustrating hydrogen removal as a function of time at a CuO/$H_2$Se ratio of 10, an initial $H_2$Se concentration of 0.0022 M, 20° C. and different pHs.

Hydrogen selenide removal was studied by the addition of different amounts of cupric oxide at different pHs. All the examples were performed at room temperature, constant stirring speed and under an argon atmosphere. The results of hydrogen selenide removal at different CuO/H$_2$Se molar ratios is shown in FIG. 14. The results of changing pH on the hydrogen selenide removal with CuO is shown in FIG. 15.

Figure 16:
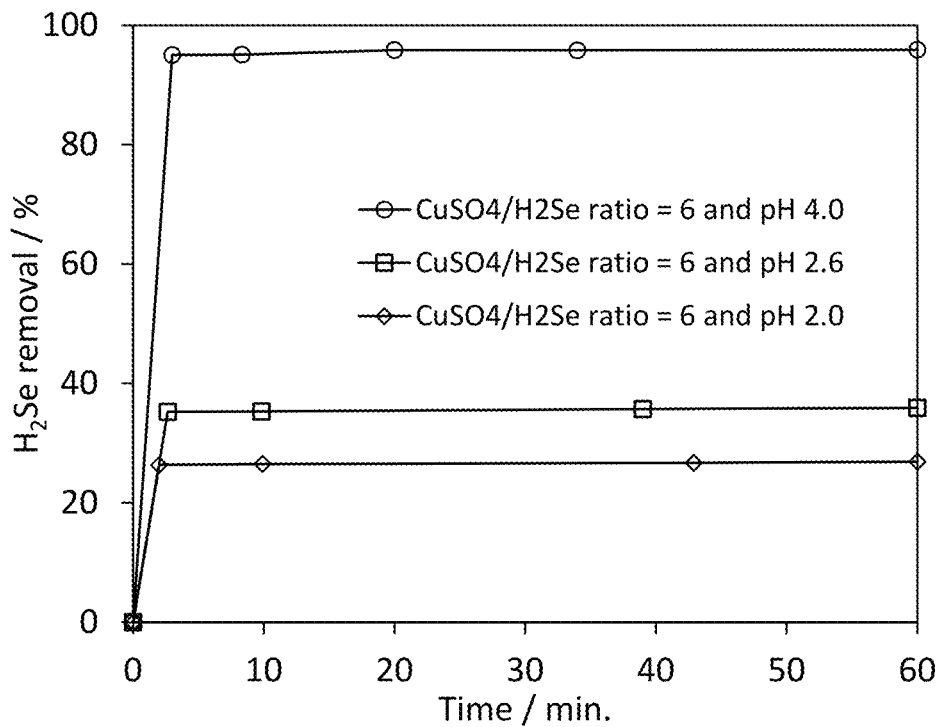
FIG. 16 is a line graph illustrating hydrogen selenide removal as a function of time at a $CuSO_4/H_2Se$ molar of 6, 22° C., an initial $H_2$Se concentration of 0.0022 M, 20° C. and different pHs.

The hydrogen selenide removal as a function of time at different pH, CuSO$_4$ to H$_2$Se molar ratio of 6, and an initial hydrogen selenide concentration of 0.0022M are shown in FIG. 16.

Figure 17:
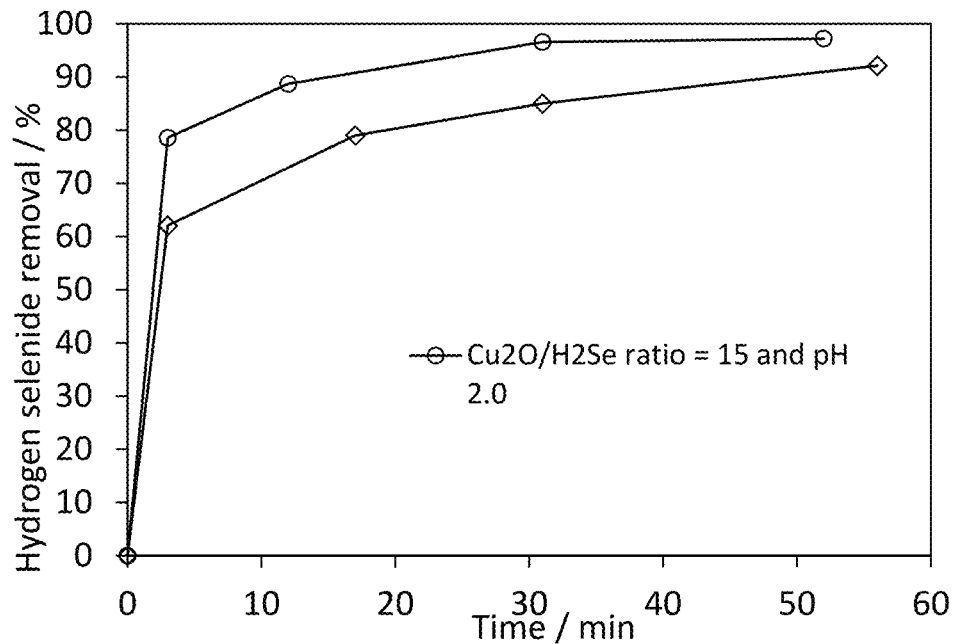
FIG. 17 is a line graph illustrating hydrogen selenide removal as a function of time at a $Cu_2Se/H_2Se$ molar of 6 and 15, 22° C., an initial $H_2$Se concentration of 0.0022 M, 20° C. and pH 2.

FIG. 17 shows the hydrogen selenide removal efficiency as a function of time at different molar ratios of Cu$_2$O to H$_2$Se from a 0.002 M H$_2$Se solution at pH 2. It was observed that hydrogen selenide was quickly removed within the first 10 minutes and then hydrogen selenide removal increased slightly over the time. Hydrogen selenide removal increased from 92 to 97% with increasing Cu$_2$O/H$_2$Se molar ratio from 6 to 15.

Figure 18:
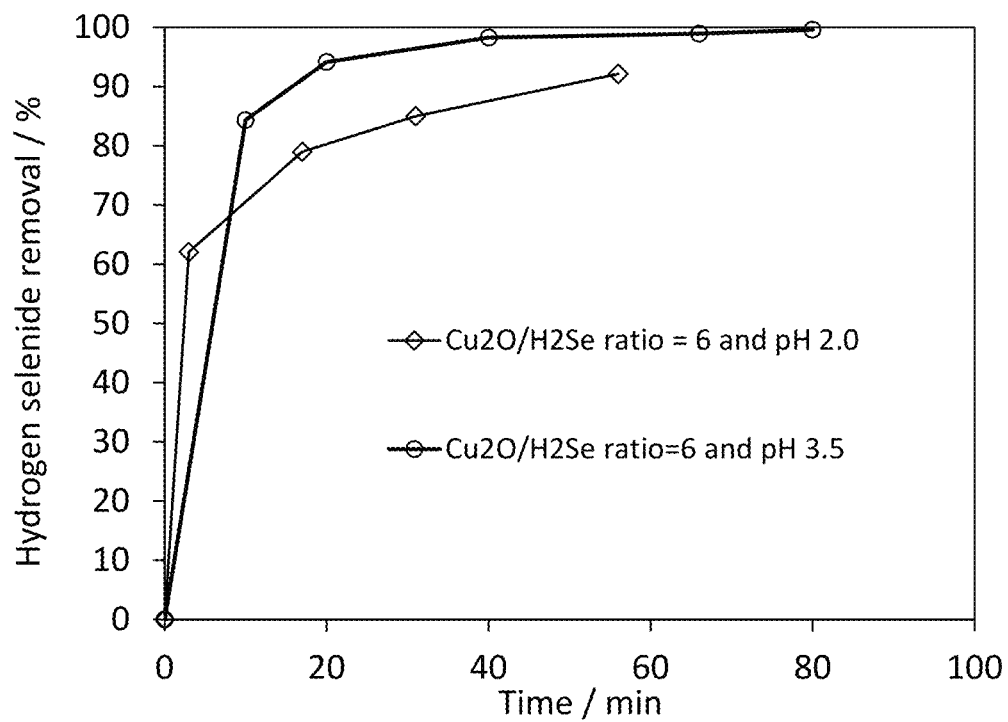
FIG. 18 is a line graph illustrating hydrogen selenide removal as a function time at pH 2 and 3.5, an initial $H_2$Se concentration of 0.0022 M, 20° C. and $Cu_2O/H_2Se$ molar ratio of 6.

Hydrogen selenide removal as a function of time at pH 2 and 3.5 and Cu$_2$O to H$_2$Se molar ratio of 6 are shown in FIG. 18. At pH 2.0, only about 90% of the hydrogen selenide was removed while at pH 3.5 hydrogen selenide was almost completely removed from the solution. As compared to the hydrogen selenide removal with CuO, using Cu$_2$O much better removal efficiencies were observed.

Figure 19:
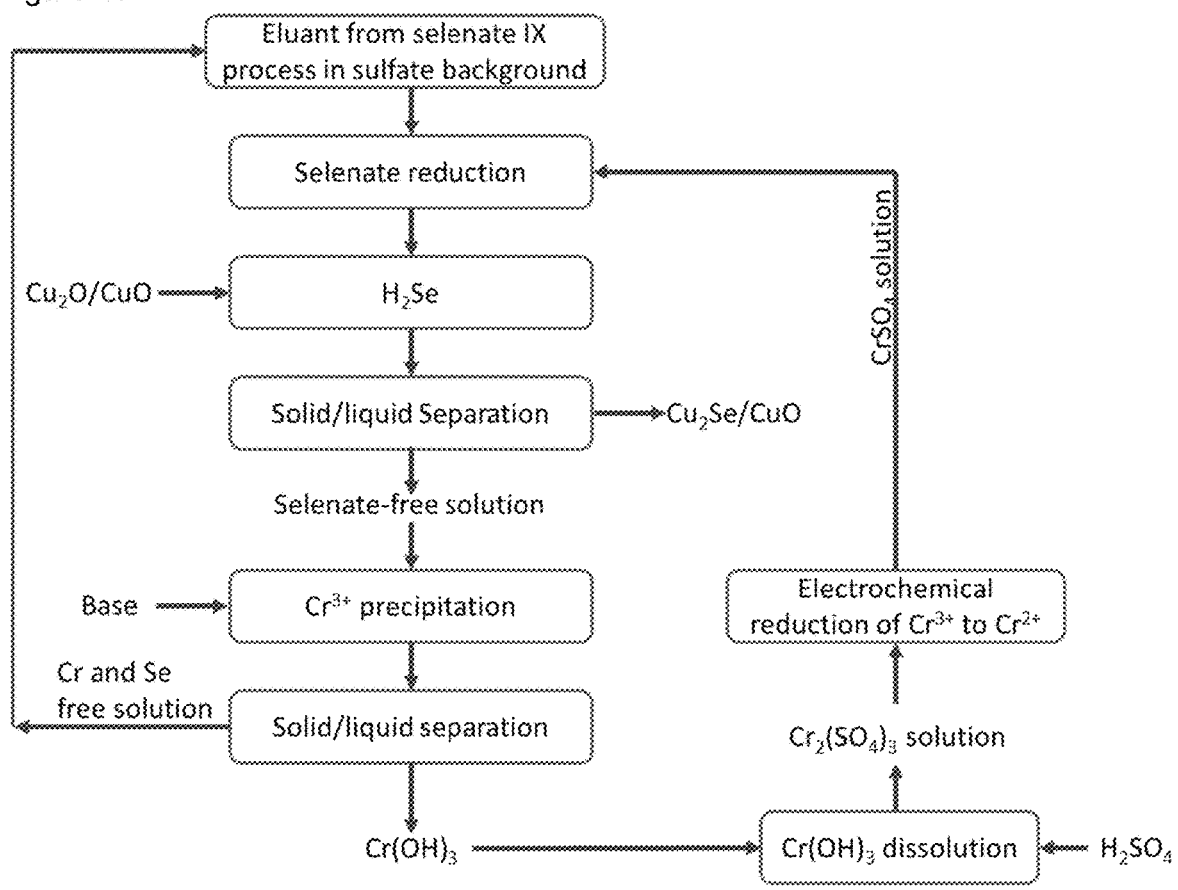
FIG. 19 is a flow sheet of the selenate removal from ion-exchange eluant with the use of chromous ions.

The integrated process for selenate removal from an ion exchange eluant is shown in FIG. 19.

REFERENCES

A. Aldaz, M. L.-A. (1991). Behaviour of the Cr(III)/Cr(II) reaction on gold-graphite electrodes. Application to redox flow storage cell, 35, 225-234.

A., Z. B., & Taube, H. (1964). The Reactions of Metal Oxides with Aquated Chromium (II) Ion. *Inorganic Chemistry*, 3(7).

Golder Associate inc., (2009). Literature Review of Treatment Technologies to Remove Selenium from Minning Influenced Water. USA.

Avudainayagam, S., Megharaj, M., Owens, G., Kookana, R. S., Chittleborough, D., & Naidu, R. (2003). Chemistry of chromium in soils with emphasis on tannery waste sites. *Reviews of environmental contamination and toxicology* (Vol. 178).

B. A. Zabin, H. T. (1964). The Reactions of Metal Oxides with Aquated Chromium (II) Ion. *Inorganic Chemistry*, 3(7).

Bae, C.-H., Roberts, E. P. L., & Dryfe, R. A. W. (2002). Chromium redox couples for application to redox flow batteries. *Electrochimica Acta*, 48(3), 279-287.

Balcerzak, Z. M. and M. (Ed.). (2000). Analytical Spectroscopy Library. In *Analytical Spectroscopy Library* (Vol. 10, p. ii). Elsevier.

Bard, A. J., Parsons, R., & Jordan, J. (1985). Standard Potentials in Aqueous Solution. *International Union of Pure and Applied Chemistry*. New York: CRC Press.

Beatty, J. M., & Russo, G. A. (2014). Ambient Water Quality Guidelines for Selenium Technical *Report: Update*. Retrieved from http://www.env.gov.bc.ca/wat/wq/BCguidelines/selenium/selenium.html Beverskog, B., & Puigdomenech, I. (1997). Revised Probaix Diagrams For Chromiums At 25-300° C. *Corrosion Science*, 39(1), 43-57.

BioTEQ. (2018). U.S. Pat. No. 9,963,360.

Bueker, E. L., & Kofron, V. K. (1958, November). Method of producing purified selenium from selenious acid solution containing impurities.

CCME. (2009). *Canadian Soil Quality*: Guidelines Selenium Environmental and Human Health effects. Winnipeg.: Canadian Council of Ministers of the Environment.

Chapman, P. M. (2000). Proceedings of the 24 Annual British Columbia Mine Reclamation Symposium (pp. 148-159). British Columbia: Annual British Columbia Mine Reclamation Symposium.

Cooke, T. D., & Bruland, K. W. (1987). Aquatic chemistry of selenium: evidence of biomethylation. *Environmental Science & Technology*, 21(12), 1214-1219.

Dellien, I., Hall, F. M., & Hepler, L. G. (1976). Chromium, Molybdenum, and Tungsten: Thermodynamic Properties, Chemical Equilibria, and Standard Potentials. *Chemical Reviews*, 76(3), 283-310.

Dubeau, C., Sisi, J., & Ozane, N. (1971). Solubility of hydrogen selenide in water. *Chemical and Engineering Data*, 16, 78-91.

Eklund, L., & Persson, I. (2014). Structure and hydrogen bonding of the hydrated selenite and selenate ions in aqueous solution. *Dalton Transactions: An International Journal of Inorganic Chemistry*, 43(17), 6315-6321.

Geoffroy, N. (2011). Selenium Removal from Aqueous Solutions. McGill University.

Gold, S. (2013). Application for an Environmental Assessment Certificate/Environmental Impact Statement. Rescan™ Environmental Services Ltd.

Goodman, W. H. (1996, February). Removal of selenium from water by ion-exchange.

Habashi, F. (1997). Handbook of extractive metallurgy: *Primary metals; secondary metals; light metals*. VCH.

Hansen, H. C. B., Koch, C. B., Nancke-Krogh, H., Borggaard, O. K., & Sørensen, J. (1996). Abiotic Nitrate Reduction to Ammonium: Key Role of Green Rust. *Environmental Science & Technology*, 30(6), 2053-2056.

Hatfield, D. L., Berry, M. J., & Gladyshev, V. N. (Eds.). (2012). *Selenium*. New York, N.Y.: Springer New York.

Hollander, M. L., & Lebedeff, Y. E. (1958, May). Recovery of selenate values contained in sulfuric acid solutions.

Hong, T. (2015). *Fundamental Study on Tin Recovery in Acidic Aqueous Systems*. The University of British Columbia.

IAEA. (2007). Speciation Analysis of Arsenic, Chromium and Selenium in Aquatic Media (pp. 26-29). Vienna.

International Atomic Energy Agency. (2007). *Speciation analysis of arsenic, chromium and selenium in aquatic media: proceedings of a final research coordination meeting held in Vienna, 26-29 Apr. 2004*. International Atomic Energy Agency.

Jalan, V., Stark, H., & Giner, J. (1981). Requirements for optimization of electrodes and electrolyte for the iron/chromium Redox flow cell.

Jalan, V., Stark, S., & Giner, J. (1985). *Requirements for optimization of electrodes and electrolyte for the iron/chromium redox flow cell*. National Aeronautics and Space Administration. Lewis Research Center; Giner, Inc., Waltham, Mass. (USA). Cleveland, OH (USA.

Johnson, D. A., & Reid, M. A. (n.d.). Chemical and Electrochemical Behavior of the Cr(III)/Cr(II) Half Cell in the NASA Redox Energy Storage System. Detroit, Michigan.

Jr, W. T. F., Amrhein, C., Fan, T. W. M., Flaschi, D., Glater, J., Jr, E. K., Toto, A. (2004). Advanced Treatment Technologies in the Remediation of Seleniferous Drainage Waters and Sediments. *Irrigation and Drainage Systems*, 18(1), 19-42.

Kelsall, G. H., House, C. I., & Gudyanga, F. P. (1988a). Cemical and Electrochemical and Kinetics in Equilibria Aqueous Cr(III)/Cr(II) Chloride Solutions. *Electroanal Chem*, 244, 179-201.

Kelsall, G. H., House, C. I., & Gudyanga, F. P. (1988b). Chemical and electrochemical equilibria and kinetics in aqueous Cr(III)/Cr(II) Chloride solutions. *Journal of Electroanalytical Chemistry and Interfacial Electrochemistry*, 244(1-2), 179-202.

Kelsall, G. H., & Yin, Q. (1999a). Indirect electrochemical reduction of lead sulfide precipitates (p. 10). IChemE.

Kelsall, G. H., & Yin, Q. (1999b). Indirect Electrochemical Reduction of Lead Sulfide precipitates. In *5th European Sympisium on Electrochemical Engineering* (Vol. 145, pp. 239-348).

Klaning, U. K., & Sehested, K. (1986). Selenium(V). A pulse radiolysis study. *The Journal of Physical Chemistry*, 90(21), 5460-5464.

Kotaś, J., & Stasicka, Z. (2000). Chromium occurrence in the environment and methods of its speciation. *Environmental Pollution*, 107(3), 263-283.

Koyama, K., M. Kobayashi, A. T. (2000). Removal of selenium in effluents of metal refineries by chemical reduction using solid iron. In processing and *Environmental Aspects of As, Sb, Se, Te, and Bi* (pp. 363-370).

Koyama, K., Kobayashi, M., & Tsunashima, A. (2000). Removal of selenate in effluents of metal refineries by chemical reduction using solid iron (pp. 363-69). Salt Lake City, Utah.

Ladriere J. (1973). Reduction of selenic acid by copper in the presence of cupric ions. *BULLETIN DES SOCIETES CHIMIQUES BELGES*, 82, 99-122.

Lange, R. C. (1966). The Chemistry of Selenium, Tellurium, and Polonium. *Journal of the American Chemical Society*, 88(19), 4548-4548. https://doi.org/10.1021/ja00971a073

Lemly, A. D. (2004). Aquatic selenium pollution is a global environmental safety issue. *Ecotoxicology and Environmental Safety*, 59(1), 44-56.

Levy, D., & Mysers, R. (1990). Spectroscopic Determination of the Second Dissociation Constant of H2Se and the Activity Coefficients and Spectral Shifts of Its Ions. *Journal of Physical Chemistry*, 94, 7842-7847.

Lide, D. (2005). *Handbook of Chemistry and Physics*. FL: CRC Press, Boca Raton.

Lingane, J. J., & Niedrach, L. (1948). Potentiometric Titration of +4 and +6 Selenium and Tellurium with Chromous Ion. *Journal of the American Chemical Society*, 70(6), 1997-2000.

Maghdy, S. H. (2011). *Dynamics and Bioavailability of Heavy Metals in the Rootzone*. New York: CRC Press. Taylor & Francis group.

Malik, W. U., & Abubacker, K. M. (1960). The Influence of Acid and Salts on the use of Chromous Chloride as a Reducing Titrant. *Analytica Chimica Acta*, 23, 518-523.

Mokmeli, M., Wassink, B., & Dreisinger, D. (2013). Kinetics study of selenium removal from copper sulfate—sulfuric acid solution. *Hydrometallurgy*, 139, 13-25.

Mondal, K., Jegadeesan, G., & Lalvani, S. B. (2004). Removal of selenate by Fe and NiFe nanosized particles. *Industrial and Engineering Chemistry Research*, 43(16), 4922-4934.

Moore, L., & Mahmoudkhani, A. (2011). Methods for removing selenium from aqueous systems.

Murphy, A. P. (1988). Removal of selenate from water by chemical reduction. *Industrial & Engineering Chemistry Research*, 27(1), 187-191. https://doi.org/10.1021/ie00073a033

*NAMC White Paper Report Addendum*. (2013).

Okamot, K., Komatsu, K., Murai, O., & Sakaguchi, O. (1972). *one-electron reducibility of the substituted tropylium ions with chromous ion*. Britain.

Olegario, J. T., Yee, N., Miller, M., Sczepaniak, J., & Manning, B. (2010). Reduction of Se(VI) to Se(−II) by zerovalent iron nanoparticle suspensions. *Journal of Nanoparticle Research*, Olin, A., Nolong, B., Osadch, E., Ohman, L., & Rosen, E. (2005). Chemical Thermodynamics of Selenium. In *Chemical Thermodynamics*. Amsterdam: Elsevier B. V.

Peak, D. (2006). Adsorption mechanisms of selenium oxyanions at the aluminum oxide/water interface. *Colloid and Interface Science*, 303, 337-345.

Peak, D., & Sparks, D. L. (2002). Mechanisms of Selenate Adsorption on Iron Oxides and Hydroxides. *Environmental Science & Technology*, 36(7), 1460-1466.

Pecsok, R. L. (1945). Preparation of Standard Chromous Sulfate or Chromous Chloride Solutions of Determinate Concentration, (5), 2-5.

Pedzana, F. (1988). *ELECTROHYDROMETALLURGICAL REDUCTION OF CASSITERITE (SnO2) ASSOCIATED WITH SULPHIDE MINERALS*. Univercity of London.

Perry, D. (2011). *Handbook of Inorganic Compounds*. CRC Press.

Philippini, V., Aupiais, J., & Vercouter, T. (2013). Formation of MSeO4(aq) complexes (M2+=Mg2+, Co2+, Ni2+, Cu2+, Cd2+) studied as a function of temperature by affinity capillary electrophoresis. *Electrophoresis*, 34(4), 541-551. https://doi.org/10.1002/elps.201200378

Press, N. A. (1983). *Selenium in Nutrition, Revised Edition*. Washington, D.C.: NATIONAL ACADEMY PRESS Washington, D.C.

Rai, D., Sass, B. M., & Moore, D. A. (1987). Chromium(III) Hydrolysis Constants and Solubility of Chromium(III) Hydroxide. *Inorganic Chemistry*, 26(8), 345-349.

Refait, P., Simon, L., & Génin, J. M. R. (2000). Reduction of SeO42 -anions and anoxic formation of iron(II)-Iron (III) hydroxy-selenate green rust. *Environmental Science and Technology*, 34(5), 819-825.

Rotrou AHall, William E. Jones, & Kohour N. Subramanian. (1976, Jun. 24). Process for removal of selenium and tellurium from copper bearing liquors. Retrieved from Saji, V. S., & Lee, C.-W. (2013). Selenium electrochemistry. *RSC Advances*, 3(26), 10058—

Sandy, T., & DiSante, C. (2010). *Review of Available Technologies for the Removal of Selenium from Water*. North America.

Shupack, S. I. (1991). The chemistry of chromium and some resulting analytical problems. *Environmental Health Perspectives*, 92, 7-11.

Škácha, P., Sejkora, J., & Plasil, J. (2017). Selenide Mineralization in the Příbram Uranium and Base-Metal District (Czech Republic). *Minerals*, 7, 91. https://doi.org/10.3390/min7060091

Smith, K., Lau, A. O., & Vance, F. W. (2009). Evaluation of treatment techniques for selenium removal. In *Internation Water Conference (IWC)*.

Sobolewski, A. (2000). *Evaluation of Treatment Options to Reduce Water-Borne Selenium at Coal Mines in West-Central Alberta* (No. 0-7785-4605-5). Edmonton, Alberta: Alberta Environment Water Research Users Group Edmonton.

Stefánsson, A., Gunnarsson, I., Kaasalainen, H., & Arnórsson, S. (2015). Chromium geochemistry and speciation in natural waters. *Applied Geochemistry*, 62, 200-206.

Stone, H. W., & Forstner, J. L. (1956). The Reduction of Sulfate to Sulfide in Acid Solutions by Divalent Chromium. *Journal of the American Chemical Society*, 79(8), 1840-1843.

Stone, H. W., & Forstner, J. L. (1957). The Reduction of Sulfate to Sulfide in Acid Solutions by Divalent Chromium1. *Journal of the American Chemical Society*, 79(8), 1840-1843.

Sun, B., & Skyllas-Kazacos, M. (1992). Modification of graphite electrode materials for vanadium redox flow battery application—I. thermal treatment. *Electrochimica Acta*, 37(7), Tan, L. C. (2018). *Anaerobic treatment of mine wastewater for the removal of selenate and its co-contaminants*. 'Université Paris-Est.

Tanimoto, S., & Ichimura, A. (2013). Discrimination of Inner- and Outer-Sphere Electrode Reactions by Cyclic Voltammetry Experiments. *Journal of Chemical Education*, 90(6), Terry, N. (1997). *Experimental Wetland Removal of Selenium from Wastewaters: Chevron's Enhancement Wetland as a Case Study*. University of California Water Resources Center.

Thompson-Eagle, E. T., & Jr, W. T. F. (1992). Bioremediation of Soils Contaminated with Selenium. In R. Lal & B. A. Stewart (Eds.), *Soil Restoration* (pp. 261-310). Springer New York.

Tinggi, U. (2003). Essentiality and toxicity of selenium and its status in Australia: a review. *Toxicology Letters*, 137 (1-2), 103-110.

Twidwell, L. G., & Mccloskey, J. (1999). TECHNOLOGIES AND POTENTIAL TECHNOLOGIES FOR REMOVING SELENIUM FROM PROCESS AND MINE WASTEWATER. In I. Gaballah, J. Hager, & R. Solozaral (Eds.), *Global Symposium on Recycling, Waste Treatment and Clean Technology* (pp. 1645-1656). Spain.

Upadhyay, S. K. (2006). *Chemical Kinetics and Reaction Dynamics*. Springer (Vol. 129). New York/New delphy.

Weaver, M. J., & Anson, F. C. (1976). Distinguishing between inner- and outer-sphere electrode reactions. Reactivity patterns for some chromium(III)-chromium(II)

electron-transfer reactions at mercury electrodes. *Inorganic Chemistry*, 15(8), 1871-1881.

Weckhuysen, B. M., Wachs, I. E., & Schoonheydt, R. A. (1996). Surface Chemistry and Spectroscopy of Chromium in Inorganic Oxides. *Chemical Reviews*, 96(8), 3327-3350.

Weir, D. R., Kerfoot, D. G. E., & Hofirek, Z. (1983a). REMOVAL OF SELENIUM FROM ACIDIC COPPER/NICKEL SOLUTIONS. Canada.

Weir, D. R., Kerfoot, D. G. E., & Hofirek, Z. (1983b, February). Removal of selenium from acidic copper/nickel solutions.

Weir, D. R., Kerfoot, D. G. E., & Schele, H. C. (1982). Removal od Selenium (IV) and (VI) from acidic copper sulfate solutions. Canada.

Wells, C. F., & Salam, M. A. (1968). The Kinetics of the Reaction of Chromium(II) with Hydrazine, Hydroxylamine and Hydrazoic Acid in Perchlorate Media: the Formation of Halogeno- and Sulphato-Complexes of Chromium(II). *J. Chem. Soc. (A)*, 24, 1568-1575.

Westheadt, E. W., & Gray, H. B. (1972). Kinetics of the Reduction of Metalloproteins by Chromous Ion, 69(1), 30-33.

Yin, Q., Brandon, N. P., & Kelsall, G. H. (2000). Electrochemical synthesis of Cr(II) at carbon electrodes in acidic aqueous solutions. *Journal of Applied Electrochemistry*, 30(10), 1109-1117.

Zhang, Y., Wang, J., Amrhein, C., & Frankenberger, W. T. (2005). Removal of selenate from water by zerovalent iron. *Journal of Environmental Quality*, 34(2), 487-495.

Zielinskaignaciuk, M., & Galus, Z. (1974). Kinetics and mechanism of the Cr(III)/Cr(II) electrodereaction in concentrated perchlorates and chlorides. *Journal of Electroanalytical Chemistry—J ELECTROANAL CHEM*, 50(1), 41-53.

Zingaro, R. A., & Cooper, W. C. (1974). Selenium. Van Nostrand Reinhold.

The invention claimed is:

1. A process for continuously removing dissolved selenium species from an input water stream comprising a dissolved aqueous selenate (Se(VI)) at an initial Se(VI) concentration, wherein the process removes the dissolved Se(VI) from an acidic reduction medium by reduction of the dissolved Se(VI) with chromous (Cr(II)) ions at an initial Cr(II)/Se(VI) molar ratio of 8 or above, whereby at least 95% of the Se(VI) is reduced to form a hydrogen selenide ($H_2Se$) product within a reaction time of less than 5 hours, to provide a lowered-Se(VI) solution having a final Se(VI) concentration that is lower than the initial Se(VI) concentration, and wherein the Cr(II) ions comprise recycled Cr(II) ions produced by the process.

2. The process of claim 1, wherein at least 99% of the Se(VI) is reduced to the $H_2Se$ product within the reaction time.

3. The process of claim 2, wherein the reaction time is less than 4 hours.

4. The process of claim 3, wherein the initial concentration of Se(VI) is less than 100 ppm.

5. The process of claim 4, wherein the initial concentration of Se(VI) is greater than 10 ppm.

6. The process of claim 5, wherein the final concentration of Se(VI) is less than 5 ppm.

7. The process of claim 1, wherein the reduction medium comprises a dissolved sulphate.

8. The process of claim 7, wherein the dissolved sulphate is present in a concentration of about 10 to 400 g/L.

9. The process of claim 8, wherein reduction by the Cr(II)ions in the reduction medium is selective for the dissolved Se(VI) over the dissolved sulphate.

10. The process of claim 9, wherein the process is carried out at 10-30° C.

11. The process of claim 10, wherein the pH of the acidic reduction medium is less than 2.2.

12. The process of claim 11, wherein the pH of the reduction medium is greater than 2.2 and the process is carried out above an ambient temperature and below a boiling point of the reduction medium.

13. The process of claim 1, further comprising generating at least a portion of the Cr(II) ions by a chemical or an electrochemical reduction of a chromic solution.

14. The process of claim 13, wherein the electrochemical reduction comprises reducing a solution of potassium chromium(III) sulfate dodecahydrate ($KCrSO_4 \cdot 12H_2O$).

15. The process of claim 14, wherein the reduction of the $KCrSO_4 \cdot 12H_2O$ is carried out in a divided electrochemical cell.

16. The process of claim 15, wherein the divided electrochemical cell comprises a graphite felt cathode supported by a titanium mesh.

* * * * *